US012423543B2

(12) United States Patent
Oba

(10) Patent No.: US 12,423,543 B2
(45) Date of Patent: Sep. 23, 2025

(54) INSPECTION SYSTEM, INSPECTION APPARATUS, AND METHOD OF CONTROLLING THESE

(71) Applicant: CANON KABUSHIKI KAISHA, Tokyo (JP)

(72) Inventor: Yoshitaka Oba, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 250 days.

(21) Appl. No.: 18/451,379

(22) Filed: Aug. 17, 2023

(65) Prior Publication Data

US 2024/0078400 A1 Mar. 7, 2024

(30) Foreign Application Priority Data

Sep. 1, 2022 (JP) ................................ 2022-139348

(51) Int. Cl.
*G06K 15/02* (2006.01)

(52) U.S. Cl.
CPC ..... *G06K 15/1842* (2013.01); *G06K 15/1807* (2013.01); *G06K 15/1885* (2013.01)

(58) Field of Classification Search
CPC ....................... G06K 15/1842; G06K 15/1807
See application file for complete search history.

(56) References Cited

U.S. PATENT DOCUMENTS

| | | | | |
|---|---|---|---|---|
| 6,385,348 | B1 * | 5/2002 | Harada | G06K 15/1807 358/452 |
| 2019/0174013 | A1 * | 6/2019 | Yamanaka | H04N 1/00037 |
| 2019/0215410 | A1 * | 7/2019 | d'Armancourt | H04N 1/00029 |
| 2020/0234091 | A1 * | 7/2020 | Itou | G06T 7/33 |

FOREIGN PATENT DOCUMENTS

| | | | | |
|---|---|---|---|---|
| CH | 699242 A1 * | 1/2010 | | B65H 43/08 |
| JP | 2001096872 A * | 4/2001 | | |
| JP | 2023158554 A * | 10/2023 | | |
| KR | 102261314 B1 * | 6/2021 | | G01B 11/00 |

* cited by examiner

*Primary Examiner* — Ted W Barnes
(74) *Attorney, Agent, or Firm* — ROSSI, KIMMS & McDOWELL LLP

(57) ABSTRACT

The information processing apparatus receives a print job from an external apparatus and generates, from print data included in the print job, image data for printing and image area attribute information related to content for each area included in an image to be printed. In addition, for an area in which the image area attribute information indicates a text string attribute, the information processing apparatus extracts, from the print data, direction information related to an orientation of a text string and transmits, to the printing apparatus, the image area attribute information and the direction information, together with the image data for printing. The inspection apparatus inspects a printed product according to the image data for printing, by comparing a read image of the printed product, and a reference image, which is received image data for printing, according to the image area attribute information and the direction information.

11 Claims, 18 Drawing Sheets

Configuration

IMAGE STORAGE DESTINATION:

\\filepath\group\category\title\name\date

OPERATION MODE SETTING: ~402
- ○ LOG MODE
- ● PURGE MODE

INSPECTION METHOD SETTING: ~404
- ● RIP INSPECTION

Configuration Service mode

RECOVERY SETTING:
- ○ NO-RECOVERY MODE
- ● RECOVERY MODE

```
%!PS-Adobe-3.0
%%Title:(Microsoft Word)
%%Creator:PScript5.dll Version 5.2.2
...
4960 1181 moveto      ← 601
gsave
270 rotate            ← 602
(YEAR 2021)show       ← 603
...
(%%[LastPage]%%)=
%%EOF
```

INSPECTION SYSTEM, INSPECTION APPARATUS, AND METHOD OF CONTROLLING THESE

BACKGROUND OF THE INVENTION

Field of the Invention

The present invention relates to an inspection system for inspecting the quality of a printed product, an inspection apparatus, and a method of controlling these.

Description of the Related Art

In recent years, inspection systems in which an inspection apparatus, which is in the middle of a conveyance path, inspects a sheet printed by a printing apparatus have been known. In print sheet inspection, it is determined whether a print sheet is normal by reading an image of the print sheet and then analyzing the read image. In the inspection apparatus, text string and ruled line omission, image omission, printing defects, page omission, and the like can be detected. In the inspection, it is desirable to be able to perform inspection in which an inspection range and inspection content are narrowed down without the conveyance speed of a print sheet being reduced and to be able to set an inspection area of the print sheet to a necessary range.

For example, when inspecting a text string included in a print sheet, a text string portion is read by optical character recognition (OCR) from the printed print sheet and then it is determined whether the printed text string data is defective. Japanese Patent Laid-Open No. 2001-096872 describes generating, from a print job, content information for a text string to be inspected and using the content information for print sheet inspection by efficiently extracting the content information.

However, the above-described related art has problems, which will be described below. In the above-described related art, text string orientation information is not included as content information related to a text string to be inspected. Accordingly, it is necessary to manually register readable orientation information for a text string of an inspection area as an advance preparation for performing print sheet inspection. Therefore, in a case where text strings facing various directions are included or in a case of a printed product comprising a large number of pages, the number of text strings to be manually registered becomes enormous and thus a laborious task for the user.

The present invention has been made in view of at least one of the above problems, and provides.

SUMMARY OF THE INVENTION

The present invention enables realization of a mechanism for suitably obtaining information related to an orientation of a text string formed on a sheet and then performing printed product inspection.

One aspect of the present invention provides an inspection system comprising a printing apparatus, an information processing apparatus, and an inspection apparatus, the information processing apparatus comprising: at least one first memory device that stores a set of first instructions; and at least one first processor that executes the set of first instructions to: accept a print job from an external apparatus; generate, from print data included in the print job, image data for printing and image area attribute information related to content for each area included in an image to be printed; for an area in which the image area attribute information indicates a text string attribute, extract, from the print data, direction information related to an orientation of a text string; and transmit, to the printing apparatus, the image area attribute information and the direction information, together with the image data for printing, and the inspection apparatus comprising: at least one second memory device that stores a set of second instructions; and at least one second processor that executes the set of second instructions to: receive, via the printing apparatus, the transmitted image data for printing, the image area attribute information, and the direction information; and inspect a printed product, printed by the printing apparatus according to the image data for printing, by comparing a read image, obtained by reading the printed product, and a reference image, which is the received image data for printing, according to the image area attribute information and the direction information.

Another aspect of the present invention provides an inspection apparatus capable of communicating with a printing apparatus, the inspection apparatus comprising: at least one memory device that stores a set of instructions; and at least one processor that executes the set of instructions to: receive, via the printing apparatus, image data for printing, image area attribute information related to content for each area included in an image to be printed, and, for an area in which the image area attribute information indicates a text string attribute, direction information related to an orientation of a text string, which have been transmitted from the information processing apparatus to the printing apparatus; and inspect a printed product, printed by the printing apparatus according to the image data for printing, by comparing a read image, obtained by reading the printed product, and a reference image, which is the received image data for printing, according to the image area attribute information and the direction information, wherein the image data for printing, the image area attribute information, and the direction information are information obtained by the information processing apparatus from print data included in a print job.

Still another aspect of the present invention provides a method of controlling an inspection system comprising a printing apparatus, an information processing apparatus, and an inspection apparatus, the method comprising: in the information processing apparatus, accepting a print job from an external apparatus; generating, from print data included in the print job, image data for printing and image area attribute information related to content for each area included in an image to be printed; for an area in which the image area attribute information indicates a text string attribute, extracting, from the print data, direction information related to an orientation of a text string; and transmitting, to the printing apparatus, the image area attribute information and the direction information, together with the image data for printing, and in the inspection apparatus, receiving, via the printing apparatus, the transmitted image data for printing, the image area attribute information, and the direction information; and inspecting a printed product, printed by the printing apparatus according to the image data for printing, by comparing a read image, obtained by reading the printed product, and a reference image, which is the received image data for printing, according to the image area attribute information and the direction information.

Yet still another aspect of the present invention provides a method of controlling an inspection apparatus capable of communicating with a printing apparatus, the method comprising: receiving, via the printing apparatus, image data for printing, image area attribute information related to content for each area included in an image to be printed, and, for an area in which the image area attribute information indicates a text string attribute, direction information related to an orientation of a text string, which have been transmitted from the information processing apparatus to the printing apparatus; and inspecting a printed product, printed by the printing apparatus according to the image data for printing, by comparing a read image, obtained by reading the printed product, and a reference image, which is the received image data for printing, according to the image area attribute information and the direction information, wherein the image data for printing, the image area attribute information, and the direction information are information obtained by the information processing apparatus from print data included in a print job.

Further features of the present invention will be apparent from the following description of exemplary embodiments with reference to the attached drawings.

DESCRIPTION OF THE EMBODIMENTS

Figure 1:
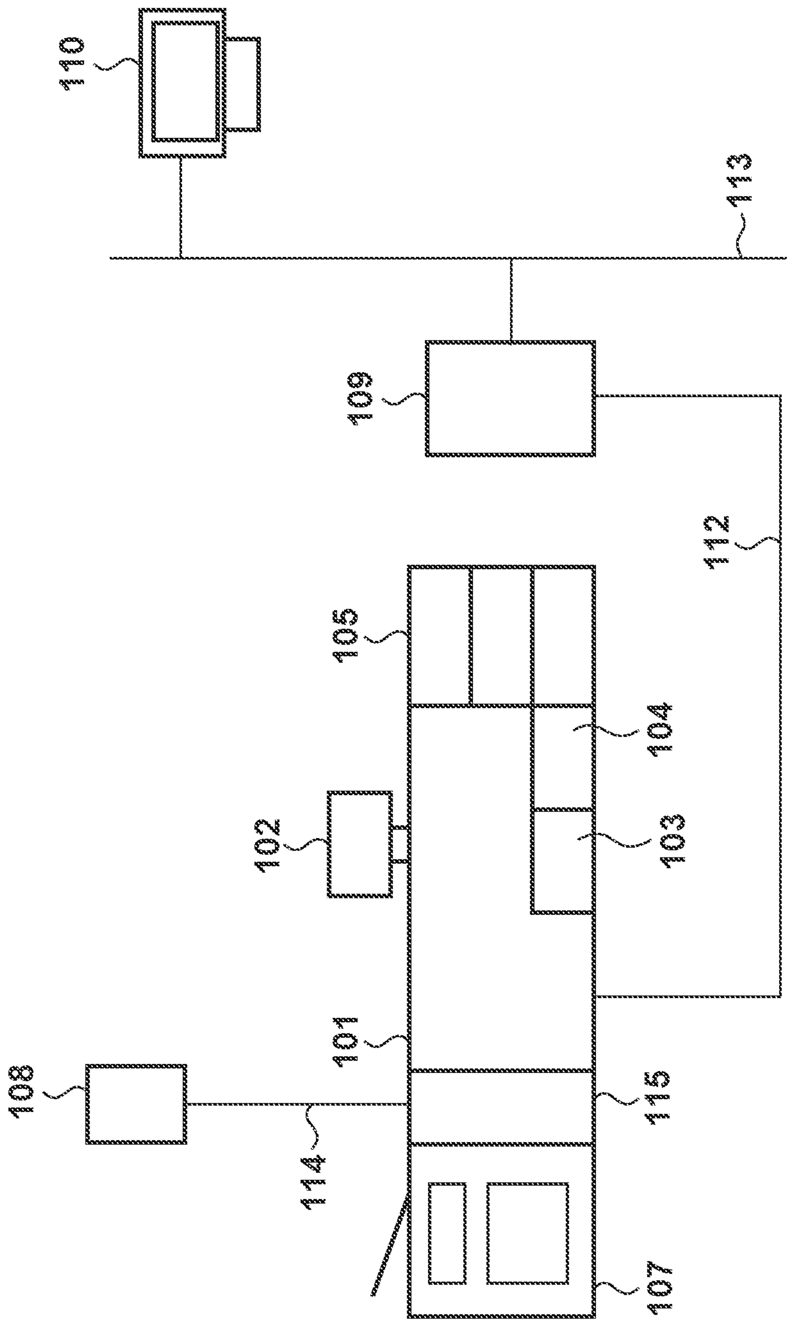
FIG. 1 is a diagram illustrating an example of a configuration of an inspection system according to one embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

First Embodiment

<Configuration of Inspection System>

Hereinafter, a first embodiment of the present invention will be described with reference to drawings. First, an example of a configuration of an inspection system according to the present embodiment will be described with reference to FIG. 1. The inspection system is configured to include at least a printing apparatus 101, an information processing apparatus 109, and an inspection apparatus 108.

The printing apparatus 101 is connected to the information processing apparatus 109 via a cable 112. The information processing apparatus 109 is connected to an external apparatus, such as a client computer 110, via a network 113. The information processing apparatus 109 is an example of a digital front end (DFE) for receiving print data from an external apparatus and then executing RIP processing. The printing apparatus 101 includes a UI panel 102, a paper feeding deck 103, and a paper feeding deck 104. Furthermore, an option deck 105, which includes three paper feeding decks, is connected. The printing apparatus 101 is, for example, an electrophotographic printing apparatus. The UI panel 102 is, for example, a user interface that includes a capacitive touch panel. The printing apparatus 101 according to the present embodiment will be described using an electrophotographic printing apparatus; however, it is not intended to limit the present invention, and the present invention may be a printing apparatus of a different image forming method, such as an inkjet method or an offset method.

Furthermore, the printing apparatus 101 includes an inspection unit 106 and a high-capacity stacker 107. The inspection unit 106 is connected to the inspection apparatus 108 via a cable 114. The high-capacity stacker 107 includes a main tray and a top tray, and several thousand sheets can be stacked on the main tray at a time. The sheets are examples of a printing media on which images are formed by the printing apparatus 101 and may be, for example, various types of paper media, such as plain paper and cardboard, or may be resin sheets, cloth, OHP sheets, labels, and the like.

A print job is generated by the client computer 110, transmitted to the information processing apparatus 109 via the network 113, and received and managed by the information processing apparatus 109. Then, the print job is transmitted from the information processing apparatus 109 to the printing apparatus 101 via the cable 112, and the printing apparatus 101 performs processing for performing printing on a sheet. A form may be taken such that a print job is generated and managed in the information processing apparatus 109, transmitted to the printing apparatus 101 via the cable 112, and managed by the printing apparatus 101.

A form may be taken such that the client computer 110, the information processing apparatus 109, and the inspection apparatus 108 are connected to the cable 112 and can communicate with the printing apparatus 101. In addition, a form may be take such that the inspection apparatus 108 is connected to the information processing apparatus 109 and the client computer 110 via the network 113. That is, a form of connection of the printing apparatus 101, the information processing apparatus 109, and the client computer 110 indicated in the present embodiment is an example, and it is needless to say that there are various forms of connection aside from that indicated in the present embodiment. In addition, a form may be taken such that the printing apparatus 101 is connected to a finisher capable of stapling, a folding machine, a bookbinding machine, or the like in addition to the inspection unit 106 and the high-capacity stacker 107.

Furthermore, the inspection apparatus 108 and the inspection unit 106 may be integrally provided. In such a case, the inspection apparatus 108 is provided with a reading unit, such as a scanner.

<Control Configuration of Inspection System>

Figure 2:
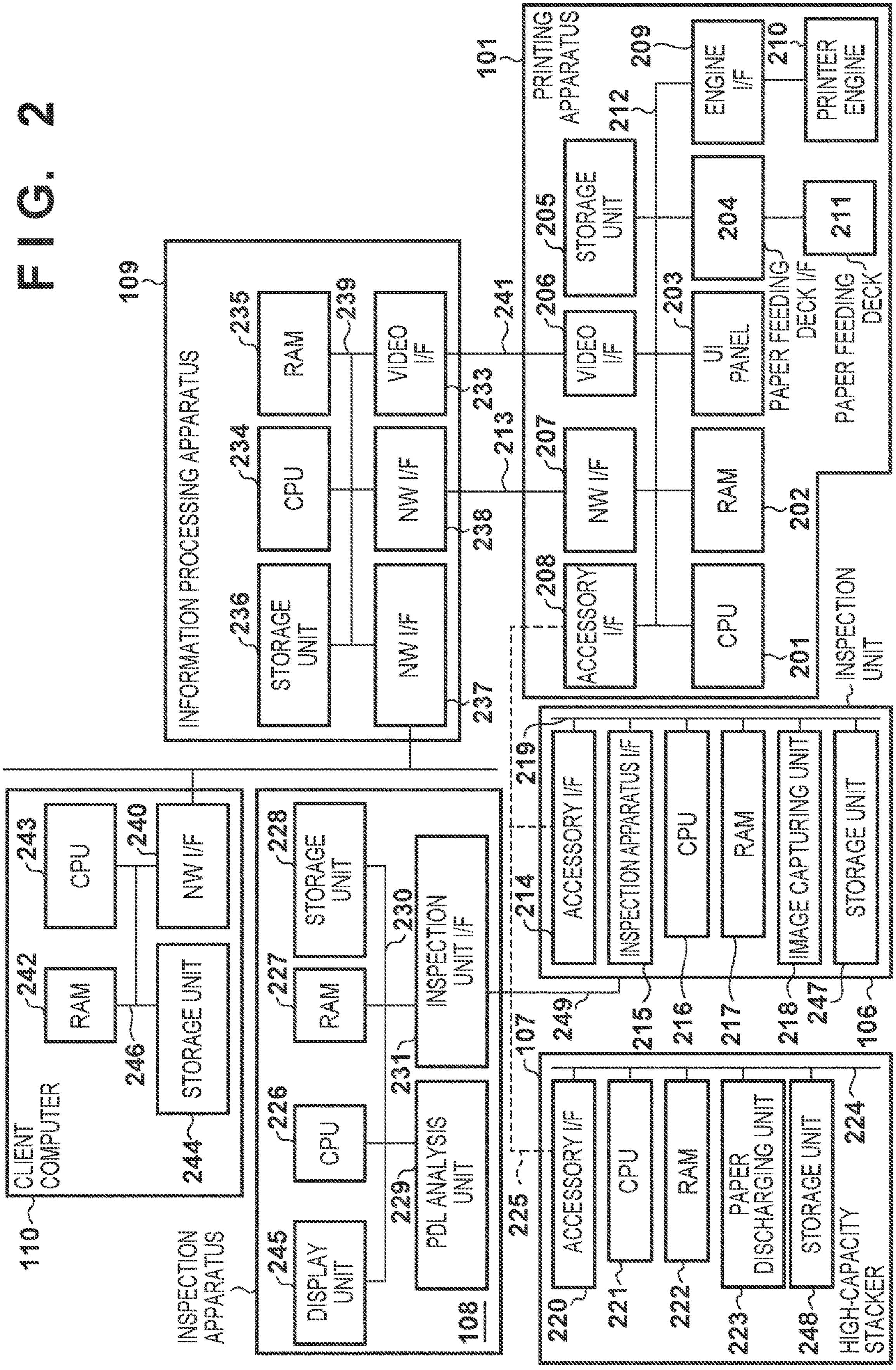
FIG. 2 is a block diagram illustrating a configuration of each apparatus of the inspection system according to one embodiment.

Next, a control configuration of the inspection system according to the present embodiment will be described with reference to FIG. 2. Here, a control configuration will be described regarding the printing apparatus 101, the inspection apparatus 108, the high-capacity stacker 107, the information processing apparatus 109, and the client computer 110.

First, the printing apparatus 101 will be described. A central processing unit (CPU) 201 performs control and computation of each unit in the printing apparatus 101 via a system bus 212. The CPU 201 controls execution of a program stored in a storage unit 205 and then loaded into a random access memory (RAM) 202. The RAM 202 is a typical volatile storage apparatus capable of being directly accessed from the CPU 201 and is used as a work area of the CPU 201 or another temporary data storage area. The storage unit 205 functions as a temporary storage area and a working memory at the time of printing apparatus operation.

An engine I/F 209 performs communication with and control of a printer engine 210. A paper feeding deck I/F 204 performs communication with and control of a paper feeding deck 211. The paper feeding deck 211 collectively refers to the paper feeding decks 103 and 104 and the option deck 105 as a hardware configuration. A UI panel 203 is a hardware configuration of the UI panel 102 and is a user interface for performing overall operation of the printing apparatus 101. In the present embodiment, it is assumed that the UI panel 203 includes a capacitive touch panel.

A network interface (hereinafter, NW I/F) 207 is connected to a NW I/F 238 of the information processing apparatus 109 via a cable 213 and controls communication between the information processing apparatus 109 and the printing apparatus 101. In this example, a format is such that the interfaces connected to system buses 212 and 239 are directly connected to each other; however, the format may be such that the information processing apparatus 109 and the printing apparatus 101 are connected to each other by, for example, a network, and the format of connection thereof is not limited. A video I/F 206 is connected to a video I/F 233 via a video cable 241 and controls communication of image data between the information processing apparatus 109 and the printing apparatus 101. An interface of the information processing apparatus 109 for connecting to the printing apparatus 101 may assume a form in which the functions of the NW I/F 238 and the video I/F 233 are integrated. An interface of the printing apparatus 101 for connecting to the information processing apparatus 109 may assume a form in which the functions of the NW I/F 207 and the video I/F 206 are integrated. An accessory I/F 208 is connected to an accessory I/F 214 and an accessory I/F 220 via a cable 225. That is, the printing apparatus 101 mutually communicates with the inspection unit 106 and the high-capacity stacker 107 via accessory I/Fs 208, 214, and 220.

Next, the inspection unit 106 will be described. A CPU 216 performs control and computation in each unit in the inspection unit 106 via a system bus 219 and execution of a program stored in a storage unit 247 and then loaded into a RAM 217. The RAM 217 is a typical volatile storage apparatus capable of being directly accessed from the CPU 216 and is used as a work area of the CPU 216 or another temporary data storage area. The storage unit 247 functions as a temporary storage area and a working memory at the time of inspection apparatus operation. An inspection apparatus I/F 215 is connected to an inspection unit I/F 231 via a cable 249. That is, the inspection unit 106 communicates with the inspection apparatus 108 via the inspection apparatus I/F 215 and the inspection unit I/F 231.

An image capturing unit 218 includes an image capturing function equipped with, for example, a contact image sensor (hereinafter, referred to as a CIS) and captures a sheet passing through the inspection unit 106 and then transmits the captured image to the inspection apparatus 108 via the inspection apparatus I/F 215. The CIS for the image capturing unit 218 is an example of a sensor and may be another type of sensor, such as a CCD image sensor, and an image capturing method thereof is not limited. There are two purposes of transmitting the captured image. One is for capturing a printed product of an inspection target print job and then transmitting the captured image to the inspection apparatus 108 for inspection, regardless of the inspection method. The other is for printing and capturing one or more copies of a print job before an inspection target print job in order to generate reference images and then transmitting the captured images to the inspection apparatus 108 as reference images when the inspection method is a scan inspection. The inspection apparatus 108 stores the transmitted images as reference images in a storage unit 228.

Next, the high-capacity stacker 107 will be described. A CPU 221 performs control and computation in each unit in the high-capacity stacker 107 via a system bus 224 and execution of a program stored in a storage unit 248 and then loaded into a RAM 222. The RAM 222 is a typical volatile storage apparatus capable of being directly accessed from the CPU 221 and is used as a work area of the CPU 221 or another temporary data storage area. The storage unit 248 functions as a temporary storage area and a working memory at the time of high-capacity stacker operation. A paper discharging unit 223 performs an operation for discharging paper to the main tray and the top tray as well as monitoring and control of a stacking status of each of the main tray and the top tray.

Next, the inspection apparatus 108 will be described. A CPU 226 performs control and computation in each unit in the inspection apparatus 108 via a system bus 230 and execution of a program stored in the storage unit 228 and then loaded into a RAM 227. The RAM 227 is a typical volatile storage apparatus capable of being directly accessed from the CPU 226 and is used as a work area of the CPU 226 or another temporary data storage area. The storage unit 228 functions as a temporary storage area and a working memory at the time of inspection apparatus operation. A PDL analysis unit 229 reads page description language (PDL) data, such as a PDF, PostScript, PCL of a print job received from the client computer 110 or the information processing apparatus 109, and then executes interpretation processing. A display unit 245 is, for example, a liquid crystal display connected to the inspection apparatus and accepts an input from a user to the inspection apparatus and displays a state of the inspection apparatus.

Next, the information processing apparatus 109 will be described. A CPU 234 performs control and computation in each unit in the information processing apparatus 109 via a system bus 239 and execution of a program stored in a storage unit 236 and then loaded into a RAM 235. The RAM 235 is a typical volatile storage apparatus capable of being directly accessed from the CPU 234 and is used as a work area of the CPU 234 or another temporary data storage area. The storage unit 236 functions as a temporary storage area and a working memory at the time of information processing apparatus operation. A network interface (hereinafter, NW I/F) 237 is connected to a NW I/F 240 via a network. In addition, the information processing apparatus 109 communicates with the client computer 110 via the NW I/F 237 and the NW I/F 240.

In addition, a form may be taken such that the inspection apparatus 108 has a NW I/F and the information processing apparatus 109 communicates with the inspection apparatus 108 via that NW I/F and the NW I/F 237. For example, a case where RIP inspection is used as an inspection method and a RIP image used for printing by the printing apparatus 101 is used as a reference image is considered. In this case, the reference image may be transmitted to the inspection apparatus 108 via the inspection apparatus I/F 215 or may be transmitted from the NW I/F included in the inspection apparatus 108 to the inspection apparatus 108 via the NW I/F 207 and the NW I/F 237.

Next, the client computer 110 will be described. A CPU 243 performs control and computation in each unit in the client computer 110 via a system bus 246 and execution of a program stored in a storage unit 244 and then loaded into a RAM 242. The RAM 242 is a typical volatile storage apparatus capable of being directly accessed from the CPU 243 and is used as a work area of the CPU 243 or another temporary data storage area. The storage unit 244 functions as a temporary storage area and a working memory at the time of client computer operation.

<Internal Configuration>

Figure 3:
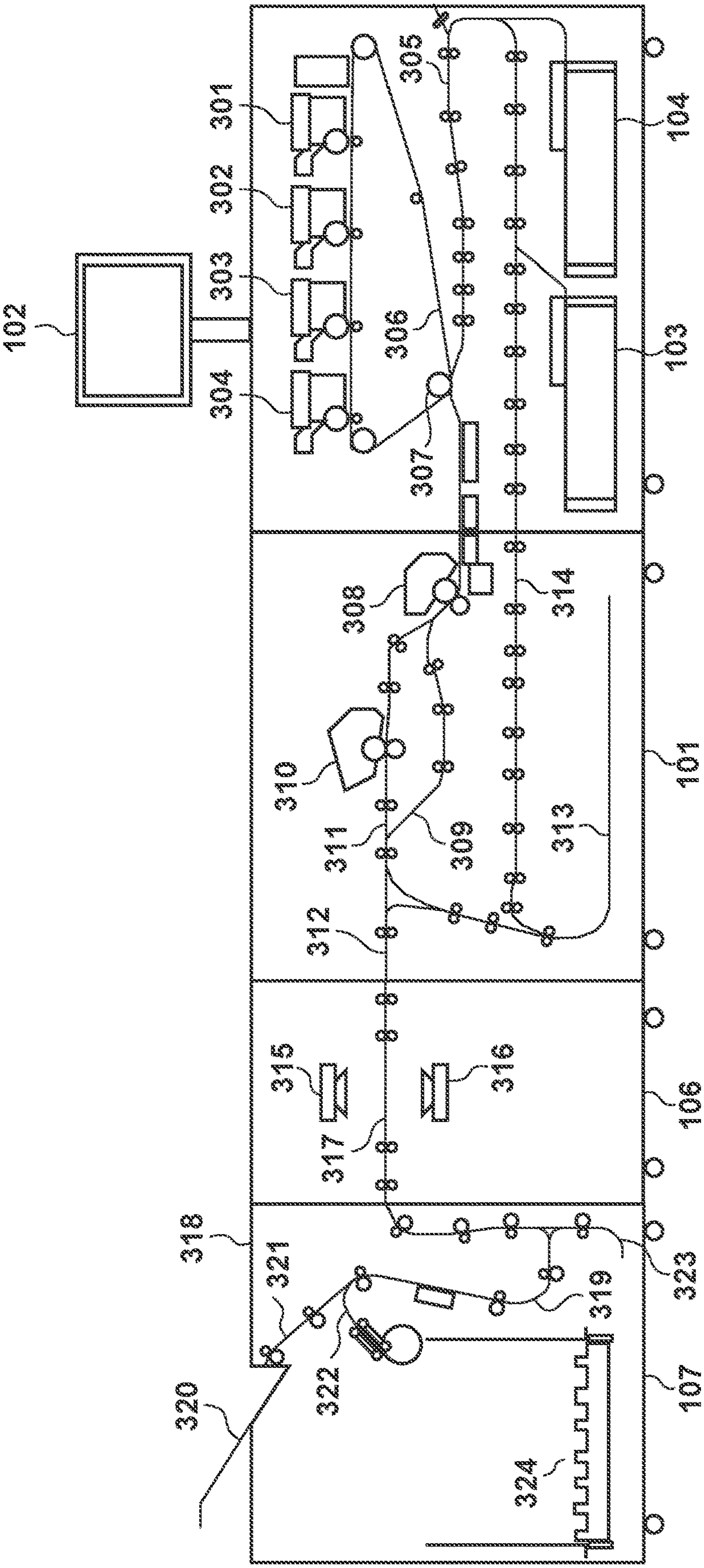
FIG. 3 is a diagram illustrating an internal configuration of an information processing apparatus, an inspection unit, a printing apparatus, and a high-capacity stacker according to one embodiment.

Next, an internal configuration of the printing apparatus 101, the inspection unit 106, and the high-capacity stacker 107 according to the present embodiment will be described with reference to FIG. 3. Here, a printing operation, a conveyance operation, a reading operation, and a discharging operation for when performing printed product inspection in the present inspection system will be described together with the internal configuration of each apparatus.

The printing apparatus 101 receives a user input and displays a print or device status via the UI panel 102. Various types of sheets can be stored in the paper feeding decks 103 and 104. In each of the paper feeding decks, it is possible to separate only the uppermost sheet of the stored sheets and convey the separated sheet to a sheet conveyance path 305. Reference numerals 301 to 304 are developing stations and form toner images using Y, M, C, and K color toner, respectively, in order to form a color image. The toner images formed here are primary-transferred onto an intermediate transfer belt 306. The intermediate transfer belt 306 rotates clockwise in the drawing, and the toner images are transferred to a sheet conveyed from the sheet conveyance path 305 at reference numeral 307, which is a secondary transfer position. A fixing unit 308 includes a pressure roller and a heating roller and fixes the toner images on the sheet by melting and pressing the toner by passing the sheet between the rollers. The sheet that has passed through the fixing unit 308 is conveyed to reference numeral 312 through a sheet conveyance path 309. When further melting and pressing is necessary for fixing depending on the type of sheet, after passing through the fixing unit 308 the sheet is conveyed to a second fixing unit 310 using an upper sheet conveyance path. After additional melting and pressing has been performed, the sheet is conveyed to reference numeral 312 through a sheet conveyance path 311. When an image forming mode is double-sided, the sheet is conveyed to the sheet reversing path 313, the sheet is reversed at reference numeral 313, and then the sheet is conveyed to a double-sided conveyance path 314, and image transfer for the second side is performed at the secondary transfer position 307. When the sheet is conveyed to reference numeral 312, the sheet is conveyed to the inspection unit 106.

In the inspection unit 106, CISs 315 and 316 are arranged in a form in which they are facing each other. The CIS 315 is a sensor for reading the upper side (front side) of the sheet, and the CIS 316 is a sensor for reading the bottom side (back side) of the sheet. The inspection unit 106 scans the sheet by using the CISs 315 and 316 at a timing at which the sheet conveyed to a sheet conveyance path 317 reaches a predetermined position. The scanned image is transmitted to the inspection apparatus 108 via the inspection apparatus I/F 215 and the inspection unit I/F 231. The CPU 226 of the inspection apparatus 108 determines whether there is an abnormality in the received image and notifies the inspection unit 106 of the determined inspection result via the inspection unit I/F 231 and the inspection apparatus I/F 215. The CPU 216 notifies the high-capacity stacker 107 of the received inspection result via the accessory I/Fs 214 and 220.

The high-capacity stacker 107 is a stacker capable of stacking a large number of sheets. The high-capacity stacker 107 includes a main tray 324 as a tray for stacking sheets. The sheet that has passed through the inspection unit 106 enters the high-capacity stacker 107 through a sheet conveyance path 319. The sheet is stacked onto the main tray 324 from the sheet conveyance path 319 via a sheet conveyance path 322. Furthermore, the high-capacity stacker 107 includes a top tray 320 as a paper discharge tray. The CPU 221 of the high-capacity stacker 107 discharges, to the top tray 320, a sheet for which an abnormality has been detected by the inspection apparatus 108. When outputting a sheet to the top tray 320, the sheet is conveyed from the sheet conveyance path 319 to the top tray 320 through a sheet conveyance path 321. Reference numeral 323 is a reversing unit for reversing a sheet. The reversing unit 323 is used for stacking sheets on the main tray 324. When stacking a sheet on the main tray 324, the reversing unit 323 reverses the sheet once so that a direction in which the sheet enters and a direction of the sheet at the time of stacking are the same. When conveying a sheet to the top tray 320, the sheet is discharged as is without being flipped at the time of stacking, and thus, the reversing operation in the reversing unit 323 is not performed.

<Setting Screens>

Figure 4A:
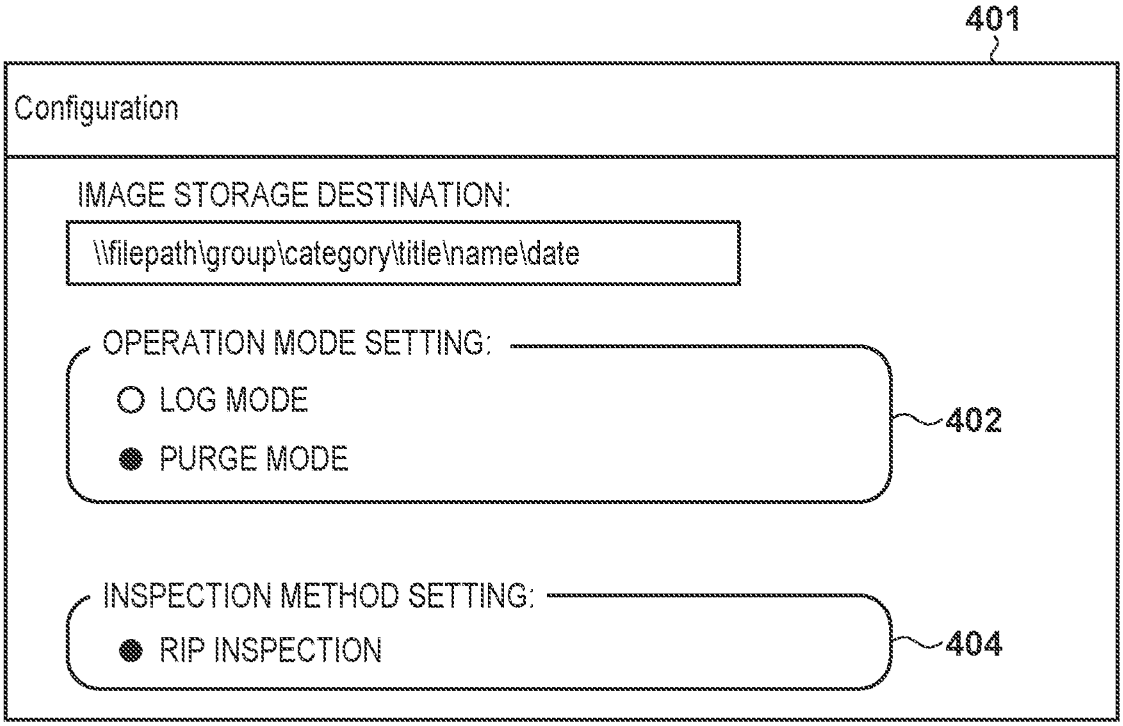
FIGS. 4A and 4B are diagrams illustrating inspection apparatus setting screens for designating an operation mode of an inspection apparatus and the inspection unit according to one embodiment.

Next, setting screens to be displayed on the display unit 245 of the inspection apparatus 108 according to the present embodiment will be described with reference to FIGS. 4A and 4B. FIG. 4A illustrates a screen for setting an operation mode of the inspection apparatus 108. An operation mode setting screen 401 is displayed on the display unit 245 and receives an operation mode setting from the user. A "log mode" and a "purge mode" can be selected as the operation mode. When the "log mode" is selected in an operation mode selection portion 402, the printing apparatus 101 discharges an inspected sheet to a discharge destination designated in advance in the properties of a print job, regardless of a result of inspection by the inspection apparatus 108. When the "purge mode" is selected in the operation mode selection portion 402, the printing apparatus 101 discharges a sheet for which an inspection result is no good to the top tray 320. That is, the "purge mode" is a mode in which a sheet for which an inspection result is no good is discharged to another paper discharge tray, which is different from a tray to which a sheet for which an inspection result is OK is discharged. In addition, when "RIP inspection" is selected in an inspection method selection portion 404, the inspection apparatus 108 sets an RIP image used by the printing apparatus 101 for printing as a reference image. When "RIP inspection" is not selected, a read image obtained by the inspection unit 106 separately reading a correct printed product for a reference image is set as the reference image.

Figure 4B:
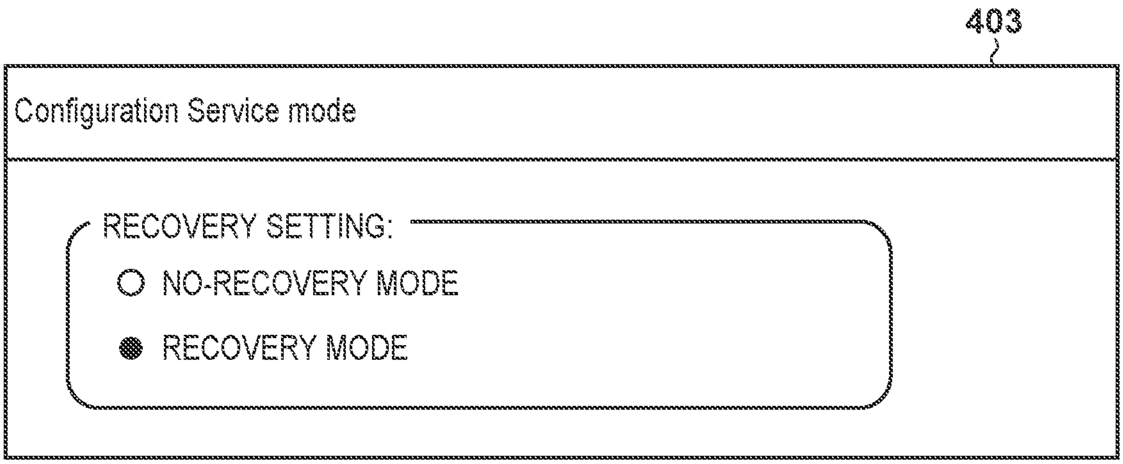

FIG. 4B is a screen for a recovery setting for the purge mode in the inspection apparatus. When the "purge mode" is selected in the operation mode selection portion 402, a recovery mode setting of a recovery mode setting screen 403 is further reflected. The recovery mode setting screen 403 is displayed on the display unit 245 and receives the recovery mode setting from the user.

When a "no-recovery mode" is selected in the recovery mode setting screen 403, the printing apparatus 101 discharges only a sheet for which an inspection result is no good to the top tray 320. The printing apparatus 101 and the inspection apparatus 108 continue inspection for subsequent sheets as normal. Meanwhile, when a "recovery mode" is selected in the recovery mode setting screen 403, the printing apparatus 101 discharges, to the top tray 320, a sheet for which an inspection result is no good and all subsequent fed sheets that are in the device at a timing at which the inspection apparatus 108 determines that the inspection result is no good. Then, when there is no sheet in the sheet conveyance paths, the printing apparatus 101 and the inspection apparatus 108 resume printing and inspection, starting from an image to be printed on the sheet for which the inspection result was no good. The inspection apparatus 108 according to the present embodiment captures images using the CISs 315 and 316 of the inspection unit 106 and performs inspection while the printing apparatus 101 performs printing. Therefore, when the inspection apparatus 108 determines that an inspection result is no good for a certain sheet, there is a possibility that subsequent sheets have already reached the sheet conveyance paths 309 and 311. However, unless all sheets in the sheet conveyance paths are discharged, it is not possible to reprint an image that had been printed on the sheet for which the inspection result was no good and then stack sheets in correct output order at a discharge destination designated in advance by a print job. Accordingly, such an operation is performed in the "recovery mode".

The CPU 226 notifies the inspection unit of the operation mode, the recovery mode, and the inspection method set in the operation mode selection portion 402, the recovery mode setting screen 403, and the inspection method selection portion 404 via the inspection unit I/F 231 and the inspection apparatus I/F 215. Regarding the operation mode, the recovery mode, and the inspection method set in the operation mode selection portion 402, the recovery mode setting screen 403, and the inspection method selection portion 404, the CPU 226 stores them in the RAM 227 and the CPU 216 stores them in the RAM 217.

<Reference Image and Content Area Information Thereof>

Next, a print output (printed product), a reference image, and content area information used in the inspection apparatus 108 according to the present embodiment will be described with reference to FIGS. 5A to 5C. In the present embodiment, for example, the printing apparatus 101 outputs an image that corresponds to print data 501 of FIG. 5A on a paper medium. Then, a print output of FIG. 5B is obtained.

Figure 5A:
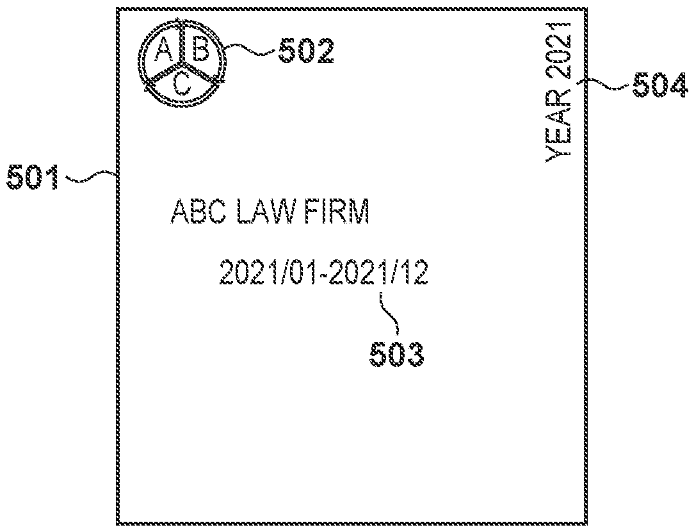
FIGS. 5A to 5C are diagrams illustrating a print output, a reference image used in the inspection apparatus, and content area information according to one embodiment.
Figure 5B:
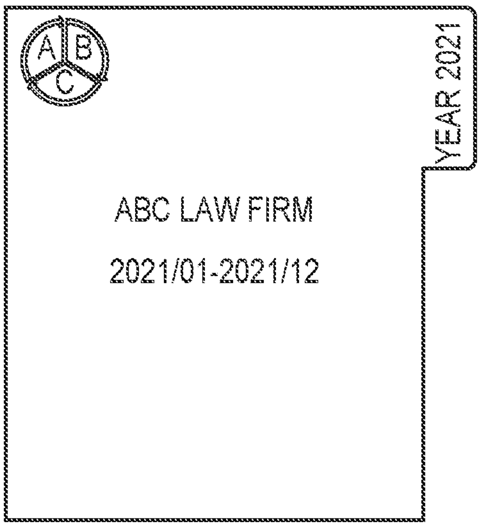

The print data 501 of FIG. 5A indicates print data for when the information processing apparatus 109 functions as a receiving unit and receives a print job. The print data 501 is configured to include an image 502, which is constituted by an image attribute and a text attribute, and a text string 503 and a text string 504, each of which is constituted by a text attribute. The text string 503 and the text string 504 are text strings written in font types and font sizes of text that can be read by OCR processing.

The print data 501 indicates PDL commands outputted from an application on the client computer 110. That is, the print data 501 indicates data for printing to be executed in a print job. The CPU 201 of the printing apparatus 101 generates RIP image (bitmap image) data as image data for printing by performing raster image processor (RIP) processing on the print data 501. The obtained RIP image to be printed is data represented by an 8-bit digital signal for each pixel and is used as a reference image in the inspection apparatus 108 as well as for print output.

Incidentally, in the print data 501, attributes of content included in an image to be printed is represented by PDL commands; thus, it is possible to find out which image object a line or text string rendered by interpreting a PDL command corresponds. That is, by examining the pixels of an RIP image obtained by RIP processing, it is possible to find out an attribute of rendered content (hereinafter, referred to as image area attribute). In the present embodiment, "graphics", "image", and "text" are used as image area attributes.

Figure 5C:
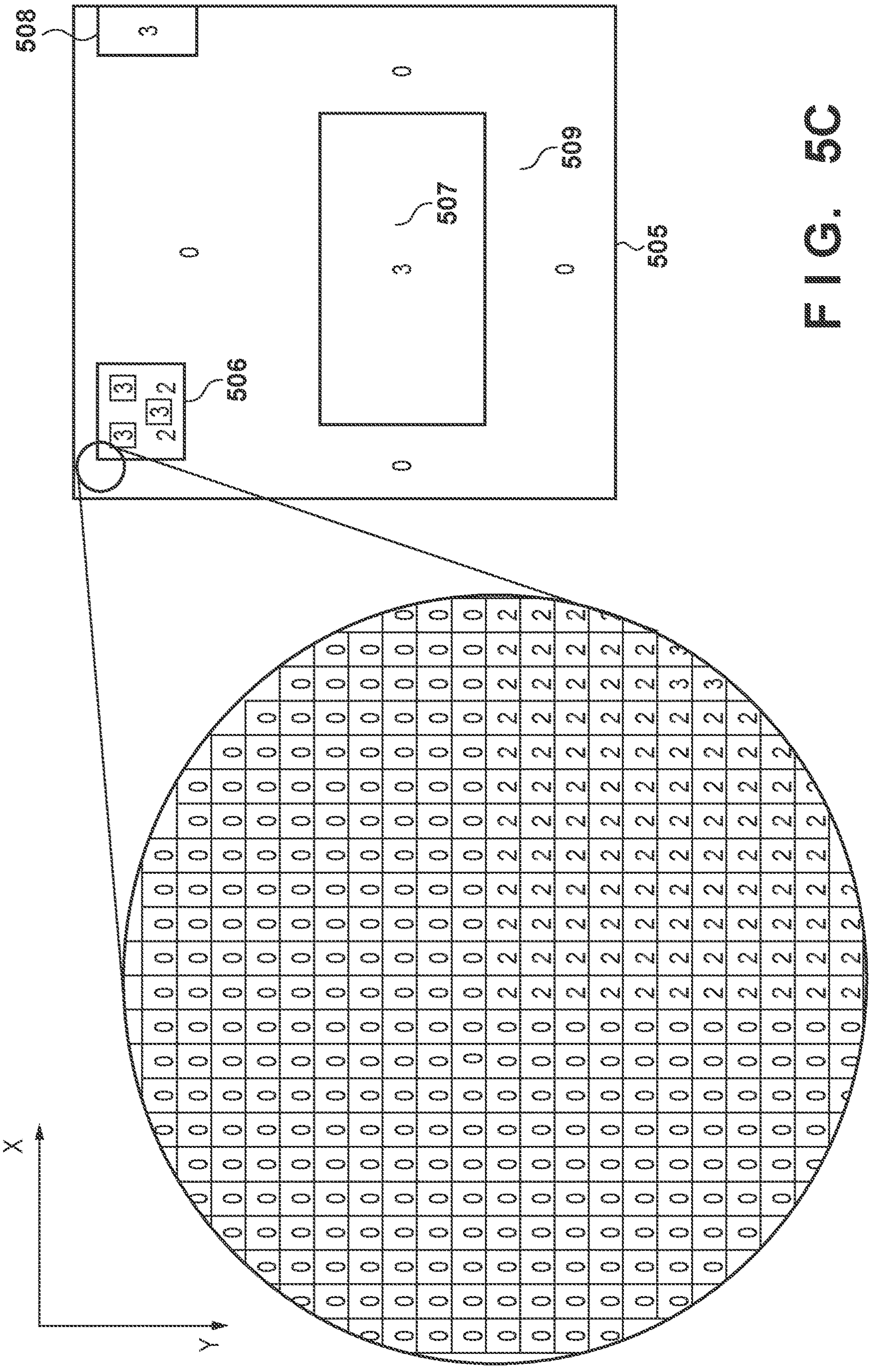

FIG. 5C is a diagram illustrating image area attributes of the print data 501. Content area information 505 is an example of image area attribute information. Specifically, in the content area information 505, regarding the image area attributes of the print data 501, a numeral, 0 (none), 1 (graphics), 2 (image), or 3 (text), is assigned for each pixel. A pixel group with an image attribute "2" is an image attribute 506. Pixel groups with a text attribute "3" are a text attribute 507 and a text attribute 508. A pixel group with no attribute "0" is no attribute 509. Although not illustrated, if there is a pixel group with a graphics attribute "1", a graphics attribute area will be included. The types of content that can be used in the inspection system are not limited to three types: graphics, images, and text. That is, if there is content, other than the above three, from among various kinds of print content that can be included in a print job, the content may be added as a new definition.

<Print Job and Content Supplementary Information>

Figure 6A:
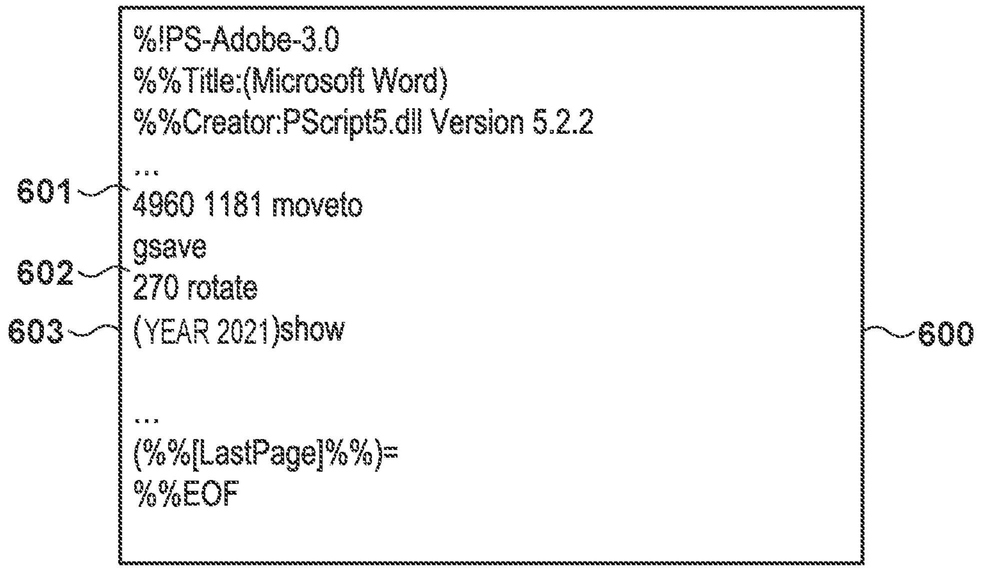
FIGS. 6A and 6B are diagrams illustrating a PDL command and content supplementary information according to one embodiment.
Figure 6B:
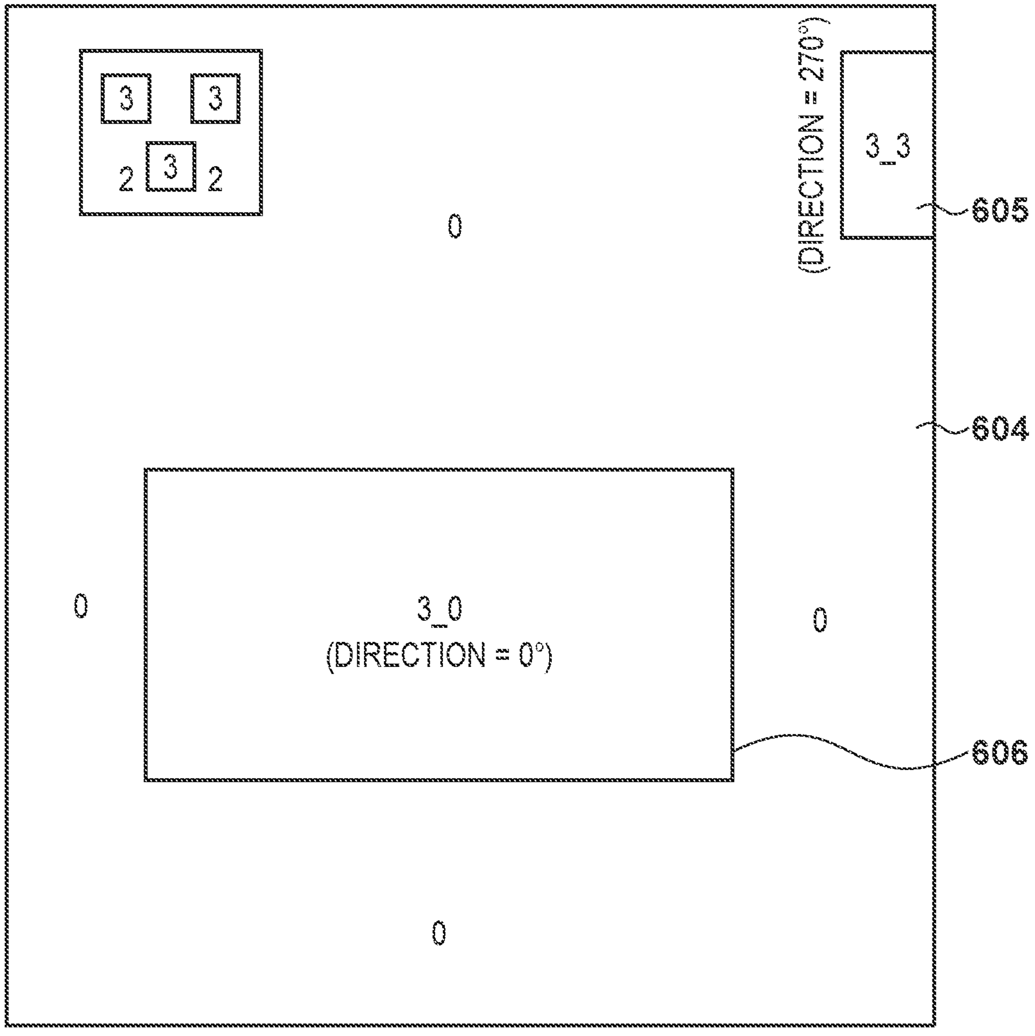
Figure 7:
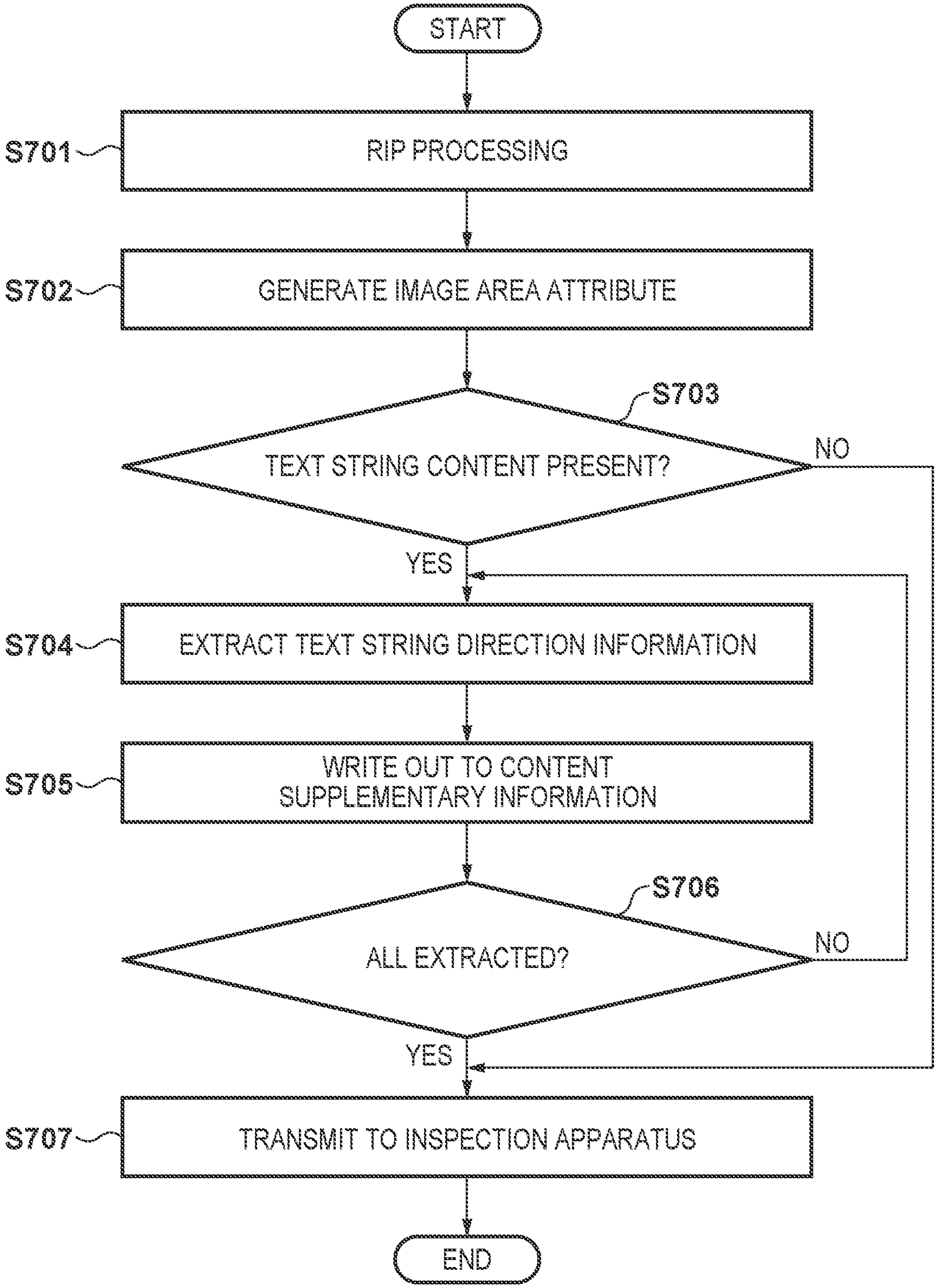
FIG. 7 is a flowchart for explaining generation of content area information and content supplementary information from a print job according to one embodiment.

Next, PDL commands 600 and content supplementary information 604 according to the present embodiment will be described with reference to FIGS. 6A and 6B. As illustrated in FIG. 6A, the print data 501 of the present embodiment includes the PDL commands 600, to be used for print output, outputted from an application on the client computer 110. For example, in a case of rendering a text string, the PDL commands 600 include a write start position 601, text string direction information 602, a text string 603, and text string font information (not illustrated), and the like. The write start position 601 indicates a value of a write start pixel in that area. According to the present embodiment, direction information for each piece of content is obtained by extracting the direction information 602 included in the PDL commands 600 prior to printing and then notifying the inspection apparatus 108 of the direction information 602. Accordingly, when comparing a read image (inspection image) of a printed product to be inspected with a reference image, which is a correct image, the inspection apparatus 108 can recognize a correct orientation of a text string using text string direction information included in the image and thus perform inspection with higher accuracy. Regarding a notification method, the inspection apparatus 108 may be notified from the information processing apparatus 109 via the printing apparatus 101, and if direct communication is possible, the inspection apparatus 108 may be notified from the information processing apparatus 109.

The text string direction information 602 is an example of information regarding an orientation of a text string and, here, indicates that the text string is rotated by 270 degrees from a normal orientation. Here, the normal orientation can be set to any orientation and indicates, for example, the same direction as a direction in which printing is performed on a sheet. In the present embodiment, a plurality of pieces of data are obtained by performing RIP processing on the print data 501. The plurality of pieces of data include a print image (referred to as reference image when used in the inspection apparatus), which is used for print output; the content area information 505; and the content supplementary information 604, which includes information associated with content area attribute, illustrated in FIG. 6B.

The content supplementary information 604 includes write start position information, which corresponds to the write start position 601; text attribute direction information 605, which corresponds to the text string direction information 602; text string font information; and the like. Regarding text attribute direction information 605 and 606, it is desirable that numerals other than “0 (none)”, “1 (graphics) ”, “2 (image)”, and “3 (text)”, which are assigned for each pixel, are used. In the present embodiment, a fourth bit and a fifth bit of an 8-bit digital signal for each pixel are used. In addition, the present invention is not limited to an 8-bit digital signal for each pixel, and the direction information may be held in a text string or other digital data. The direction information 605 indicates that a text string is rotated by 270 degrees, and the direction information 606 indicates that the text string is rotated by 0 degrees, that is, not rotated. In addition, the direction information 605 and 606 indicated here are examples of information related to an orientation of a text string. The information is not limited to the direction information and may include, for example, information on a font type and a font size, and a form thereof is not limited.

<Processing Procedure>

Next, a processing procedure for each process performed in the inspection system according to the present embodiment will be described with reference to FIG. 7 to FIG. 12. First, a processing procedure for generating the content area information 505 and the content supplementary information 604 from print data received as a print job will be described with reference to FIG. 7. The processing to be described below is realized by, for example, the CPU 234 of the information processing apparatus 109 reading a program stored in the storage unit 236 into the RAM 235 and then executing the program.

In step S701, the CPU 234 of the information processing apparatus 109 performs RIP processing on the print data 501 inputted to the information processing apparatus 109 and analyzes PDL commands included in the print data. Furthermore, the CPU 234 generates RIP image data from the print data 501 and then advances the processing to step S702. In step S702, the CPU 234 generates the content area information 505 from content image area attribute obtained by the RIP processing of step S701 and then advances the processing to step S703.

In step S703, the CPU 234 determines whether text attribute content is included in the generated content area information 505. If text attribute content is included, the CPU 234 advances the processing to step S704. Meanwhile, if text attribute content is not included, the CPU 234 advances the processing to step S707.

In step S704, the CPU 234 obtains the text string direction information 602 obtained by the RIP processing of step S701 and then advances the processing to step S705. The direction information obtained here is information included in each area that has a text attribute. In step S705, the CPU 234 writes out the text string direction information 602 obtained in step S704 to the content supplementary information 604 as the text attribute direction information 605 and then advances the processing to step S706.

In step S706, the CPU 234 confirms whether all of the text string direction information 602 obtained in step S704 has been written out to the content supplementary information 604. If all has been written out, the CPU 234 advances the processing to step S707, and if all has not been written out, the CPU 234 returns the processing to step S704. In step S707, the CPU 234 transmits the content supplementary information 604 to the inspection apparatus 108 and then ends the processing of this flowchart.

The example illustrated here is an example of processing for one print sheet. For example, a configuration may be taken such that, in a case of a plurality of print sheets, in the processing of step S706, if there is another sheet for which text string extraction is unprocessed, the processing is returned to step S704 and the text string extraction processing is performed on all sheets, and a form thereof is not limited. Further, the process of extracting the text string may be managed in association with the page information.

<Transmission Processing>

Figure 8:
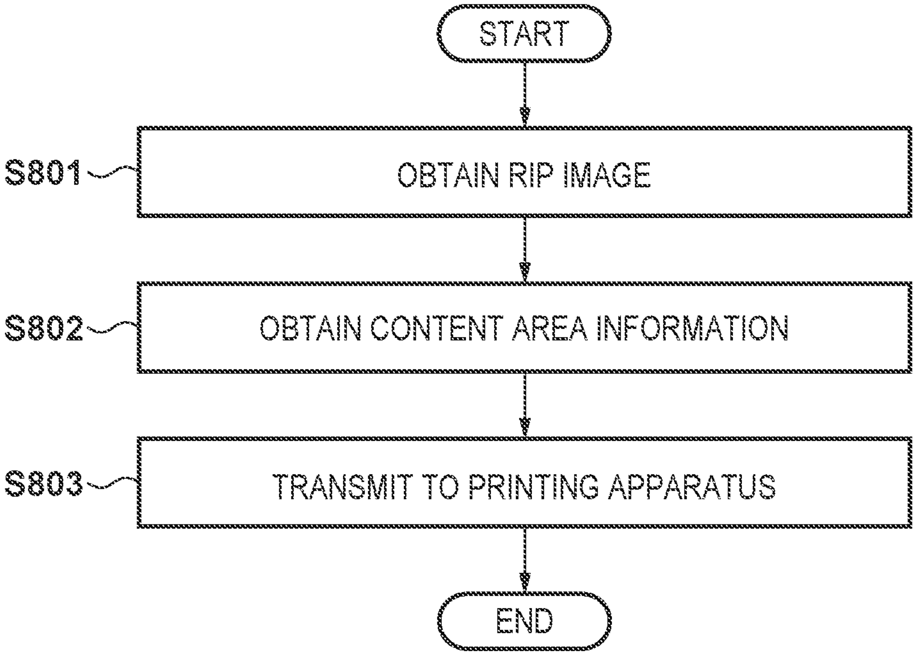
FIG. 8 is a flowchart for explaining transmission of an RIP image and content area information according to one embodiment.

Hereinafter, transmission processing related to a print job will be described with reference to FIGS. 8 and 9. FIG. 8 illustrates a processing procedure for transmitting RIP image data and the content area information 505 from the information processing apparatus 109 to the printing apparatus 101 according to the present embodiment. The processing to be described below is realized by, for example, the CPU 234 of the information processing apparatus 109 reading a program stored in the storage unit 236 into the RAM 235 and then executing the program.

In step S801, the CPU 234 obtains the RIP image data of the print data 501 generated in step S701 and then advances the processing to step S802. In step S802, the CPU 234 obtains the content area information 505 generated in step S702 and then advances the processing to step S803. In step S803, the CPU 234 transmits the RIP image data of the print data 501 and the content area information 505 to the printing apparatus 101 and then ends the processing of this flowchart.

Figure 9:
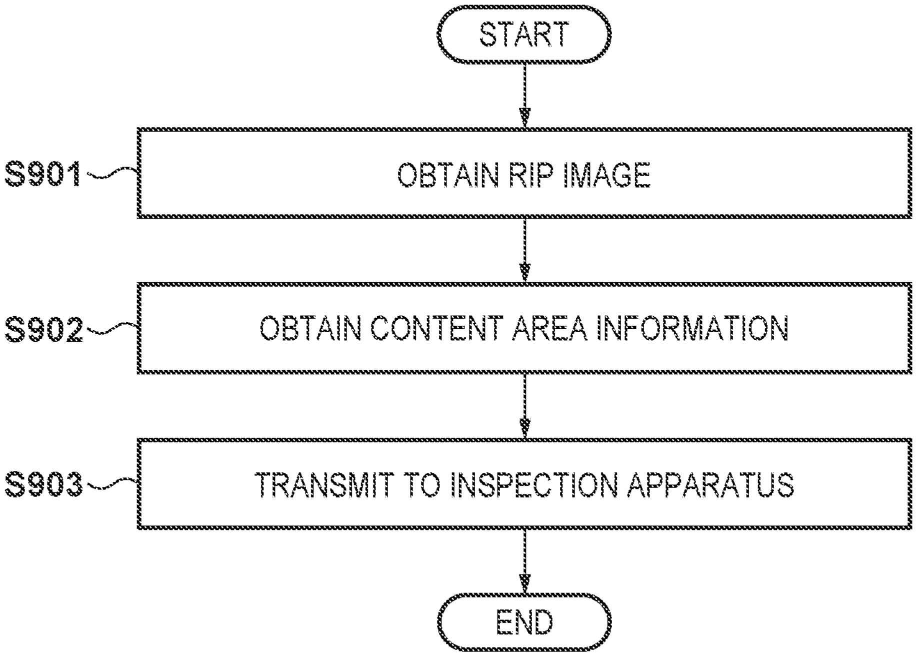
FIG. 9 is a flowchart for explaining transmission of a reference image and content area information to be used by the inspection apparatus according to one embodiment.

FIG. 9 illustrates a processing procedure for transmitting a reference image and the content area information 505 from the printing apparatus 101 to the inspection apparatus 108 according to the present embodiment. The processing to be described below is realized by, for example, the CPU 201 of the printing apparatus 101 reading a program stored in the storage unit 205 into the RAM 202 and then executing the program.

In step S901, the CPU 201 of the printing apparatus 101 obtains RIP image data from the information processing apparatus 109 and then advances the processing to step S902. The RIP image data is image data to be used for printing in the printing apparatus 101 but is used as a reference image, which is a correct image for when inspection is performed in the inspection apparatus 108. In step S902, the CPU 201 obtains content area information that the printing apparatus 101 uses in printing and then advances the processing to step S903. In step S903, the CPU 201 transmits the RIP image data and the content area information to the inspection apparatus 108 and then ends the processing of this flowchart.

<Inspection Settings>

Figure 10:
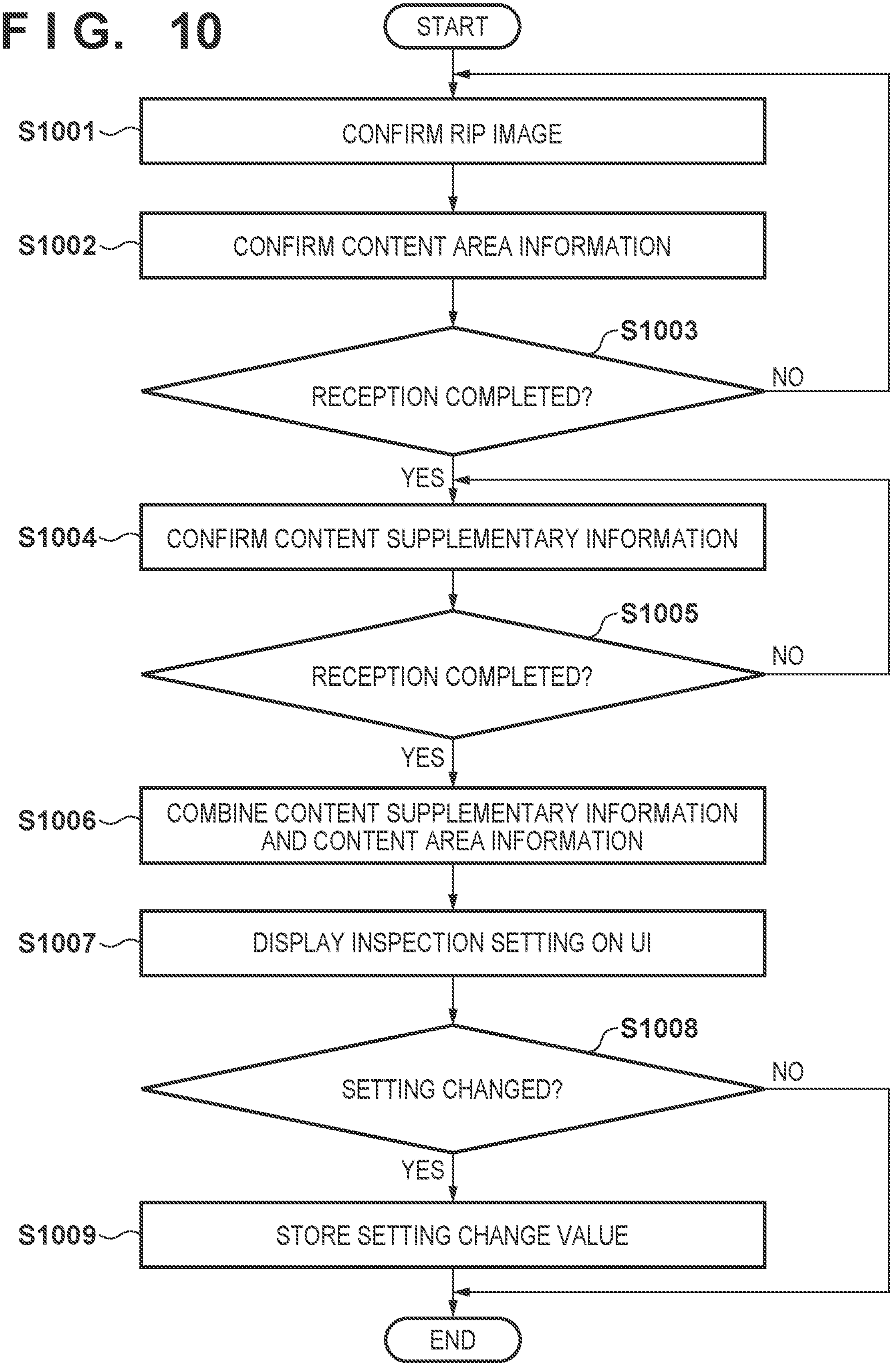
FIG. 10 is a flowchart for explaining generation of content information and confirmation of inspection settings according to one embodiment.

Next, a processing procedure for generating content information and confirming inspection settings according to the present embodiment will be described with reference to FIG. 10. The processing to be described below is realized by, for example, the CPU 226 of the inspection apparatus 108 reading a program stored in the storage unit 228 into the RAM 227 and then executing the program.

In step S1001, the CPU 226 of the inspection apparatus 108 confirms reception of the RIP image data (hereinafter, referred to as reference image), to be used as a reference image, transmitted in step S903 from the printing apparatus 101. Next, in step S1002, the CPU 226 confirms reception of the content area information 505 transmitted in step S903 from the printing apparatus 101.

In step S1003, the CPU 226 confirms whether the reception of a reference image and the content area information 505 has been completed. When the reception is completed, the CPU 226 advances the processing to step S1004, and when the reception is not completed, the CPU 226 returns the processing to step S1001. In step S1004, the CPU 226 confirms reception of the content supplementary information 604 transmitted in step S707 from the information processing apparatus 109 and then advances the processing to step S1005.

In step S1005, the CPU 226 confirms whether the reception of the content supplementary information 604 has been completed. When the reception is completed, the processing proceeds to step S1006, and when the reception is not completed, the processing is returned to step S1004. In step S1006, the CPU 226 generates content information by combining the content area information 505 and the content supplementary information 604 and then advances the processing to step S1007. Specifically, the CPU 226 combines the content supplementary information 604, which includes the text attribute direction information 605, described in FIGS. 6A and 6B and the content area information 505, and then associates the reference image and the text attribute direction information 605. That is, here, content information that includes direction information for each predetermined area, having a text attribute, in the reference image is generated.

In step S1007, the CPU 226 displays the combined content information and the reference image on the display unit 245 of the inspection apparatus 108 in order to present the combined content information and the reference image to the user of the inspection system and then advances the processing to step S1008. The user performs pre-inspection confirmation of the inspection system via a display screen. In step S1008, the CPU 226 receives a setting change instruction from the user via the display unit 245. If there is a setting change, the processing proceeds to step S1009, and if there is no setting change, the processing of this flowchart ends. In step S1009, the CPU 226 stores a setting value inputted by the user of the inspection system and then ends the processing of this flowchart.

<Inspection Processing>

Figure 11A:
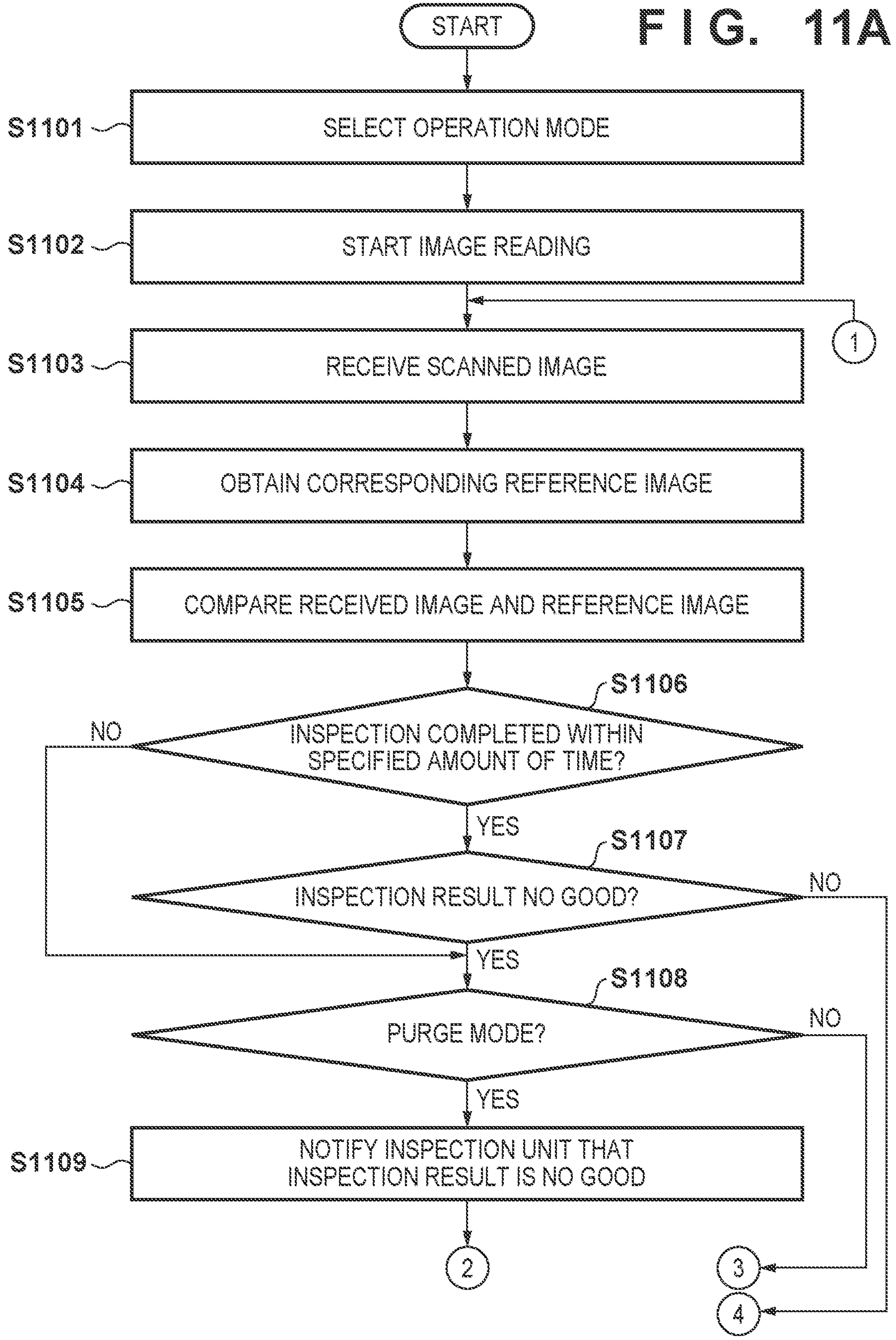
FIGS. 11A and 11B are flowcharts for explaining an inspection operation of the inspection apparatus according to one embodiment.
Figure 11B:
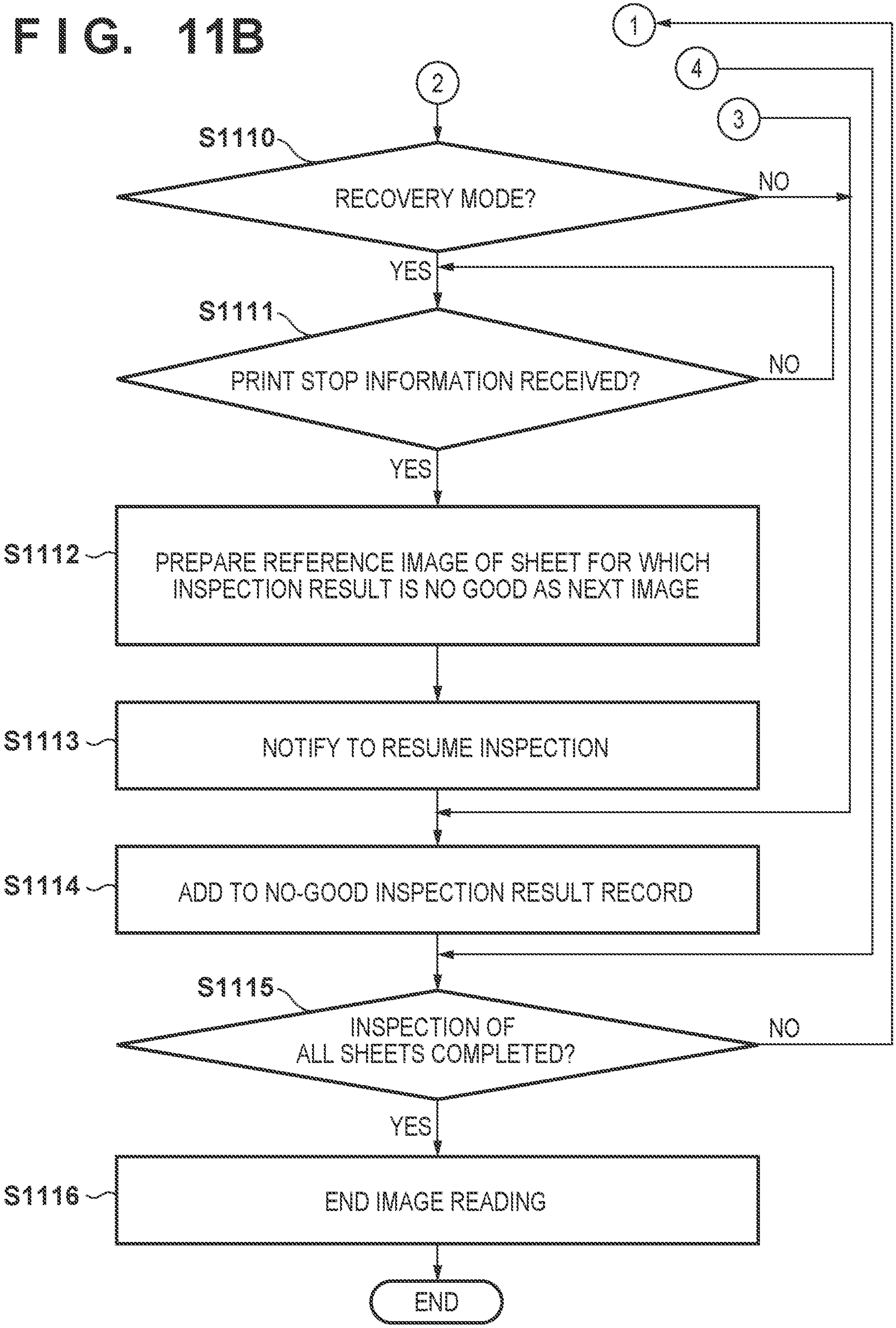

Next, a processing procedure for inspection processing by the inspection apparatus 108 according to the present embodiment will be described with reference to FIGS. 11A and 11B. The processing to be described below is realized by, for example, the CPU 226 of the inspection apparatus 108 reading a program stored in the storage unit 228 into the RAM 227 and then executing the program.

In step S1101, the CPU 226 selects an operation mode and a recovery mode setting according to a user operation on the operation mode selection portion 402 and the recovery mode selection screen 403 displayed on the display unit 245. Next, in step S1102, the CPU 226 receives an image reading start instruction from the user via the display unit 245.

In step S1103, the inspection unit I/F 231 receives an image scanned by the CIS 315 or the CIS 316 from the inspection apparatus I/F 215. This image is obtained by scanning a print result of a print job, which is a printed product, and the inspection apparatus 108 performs inspection by comparing this scanned image (also referred to as read image) and a reference image received from the printing apparatus 101. Next, in step S1104, the CPU 226 reads out, from the RAM 227, a page to be compared among reference images received from the printing apparatus 101 and advances the processing to step S1105.

In step S1105, the CPU 226 compares the reference image read out in step S1104 and the scanned image to be inspected received in step S1103. In this comparison operation, first, an image position of the reference image and an image position of the scanned image to be inspected are aligned by using characteristic points of the images as reference points for the alignment. Next, in the scanned image to be inspected, it is detected whether an image is misaligned with respect to a sheet by analyzing four corners of the sheet and the alignment reference point of the scanned image. Next, a density value of the reference image and a density value of the scanned image to be inspected are compared for each pixel. Furthermore, if a text string is included in the reference image, the text string is read by OCR and then text strings are compared. If no difference is detected between the scanned image and the reference image as a result of comparison, the CPU 226 assumes that an inspection result is OK. Meanwhile, if a difference is detected, the CPU 226 assumes that an inspection result is no good and then records details of the no-good inspection result according to the type of abnormality.

Next, in step S1106, the CPU 226 determines whether the inspection has been completed within a specified amount of time. If the inspection has been completed, the processing proceeds to step S1107, and if the inspection is not completed, the processing proceeds to step S1108. This determination is executed because, unless the inspection is completed and an inspection result is outputted within a certain amount of time, they will not be done in time for a subsequent sheet to be scanned by the CISs 315 and 316 and the inspection unit I/F 231 and the inspection apparatus I/F 215 to begin manipulating the scanned images.

In addition, when the purge mode is selected in the operation mode selection portion 402, the CPU 221 switches conveyance destinations such that the inspection apparatus 108 discharges a sheet for which an inspection result is no good to the top tray 320. The CPU 226 needs to notify the CPU 221 that the inspection result is no good via the inspection unit I/F 231, the inspection apparatus I/F 215, the accessory I/F 214, and the accessory I/F 220 before the sheet reaches a point where the conveyance destinations cannot be switched. Accordingly, if the inspection cannot be completed within a predetermined amount of time, it cannot be determined that the inspection result is OK, and so, the CPU 226 assumes that the inspection result is an error and determines that the inspection result of the sheet is equivalent to a no-good inspection result.

In step S1107, the CPU 226 determines whether the inspection result is no good. If the inspection result is no good, the processing proceeds to step S1108, and if the inspection result is OK, the processing proceeds to step S1115. In step S1108, the CPU 226 reads out the operation mode from the RAM 227 and determines whether the operation mode is the purge mode. If the operation mode is the purge mode, the processing proceeds to step S1109; otherwise, the processing proceeds to step S1114.

In step S1109, the CPU 226 notifies the CPU 216 that the inspection result is no good via the inspection unit I/F 231 and the inspection apparatus I/F 215. Next, in step S1110, the CPU 226 determines whether a recovery mode setting read out from the RAM 227 is "recovery mode". If the setting is "recovery mode", the processing proceeds to step S1111; otherwise, the processing proceeds to step S1114.

In step S1111, the CPU 226 waits until print stop information is received from the CPU 216 via the inspection unit I/F 231 and the inspection apparatus I/F 215 and, when the print stop information is received, proceeds to step S1112. In step S1112, the CPU 226 reads out, from the RAM 227, a reference image that corresponds to the sheet for which the inspection result is no good and holds the reference image as an image to be inspected next. Next, in step S1113, the CPU 226 notifies the CPU 216 to resume inspection via the inspection unit I/F 231 and the inspection apparatus I/F 215.

Next, in step S1114, the CPU 226 adds information about the sheet for which the inspection result is no good to a list of no-good inspection results, which includes information on the sheet for which the inspection result is no good. Next, in step S1115, the CPU 226 determines whether inspection of all sheets has been completed. If the inspection has not been completed, the processing returns to step S1103, and if the inspection has been completed, the processing proceeds to step S1116. In step S1116, when an image reading end instruction is received from the user via a button displayed on the display unit 245, the CPU 226 ends the image reading.

The example illustrated here is only one example. For example, the user's image reading start instruction on the display unit 245 may be automatically executed in conjunction with a print start instruction on the printing apparatus 101, the information processing apparatus 109, or the client computer 110, and a form thereof is not limited. Further, the user's image reading end instruction on the display unit 245 may be automatically executed in conjunction with the end of printing in the printing apparatus 101, and a form thereof is not limited.

<Inspection Determination Processing>

Next, a processing procedure for inspection determination processing by the inspection apparatus 108 according to the present embodiment will be described with reference to FIG. 12. Here, processing for inspecting and determining a text string in the above-described comparison of a received image and a reference image of step S1105 will be described. The processing to be described below is realized by, for example, the CPU 226 of the inspection apparatus 108 reading a program stored in the storage unit 228 into the RAM 227 and then executing the program.

In step S1201, the CPU 226 extracts a text attribute area (also referred to as text string area) from a scanned image and a reference image and then proceeds to step S1202. In step S1202, the CPU 226 performs OCR processing using the text attribute direction information 605 included in content information of the extracted text attribute area, and extracts a text string. As described above, in the inspection apparatus 108, an orientation of a text string is recognized in advance, and so, OCR processing can be performed efficiently and accurately.

In step S1203, the CPU 226 compares text strings extracted from the scanned image and the reference image. If there is a difference, the processing proceeds to step S1204, and if there is no difference, the processing proceeds to step S1205. In step S1204, if there is a difference in a result of the comparison, the CPU 226 determines that an inspection result is no good and then advances the processing to step S1206. Meanwhile, in step S1205, if there is no different in a result of the comparison, the CPU 226 determines that an inspection result is OK and then advances the processing to step S1206. In step S1206, the CPU 226 determines whether inspection of all text string areas in the page has been completed. If the inspection has not been completed, the CPU 226 returns the processing to step S1201. Meanwhile, if the inspection has been completed, the CPU 226 ends the processing of this flowchart.

<Setting Confirmation Screen>

Figure 13:
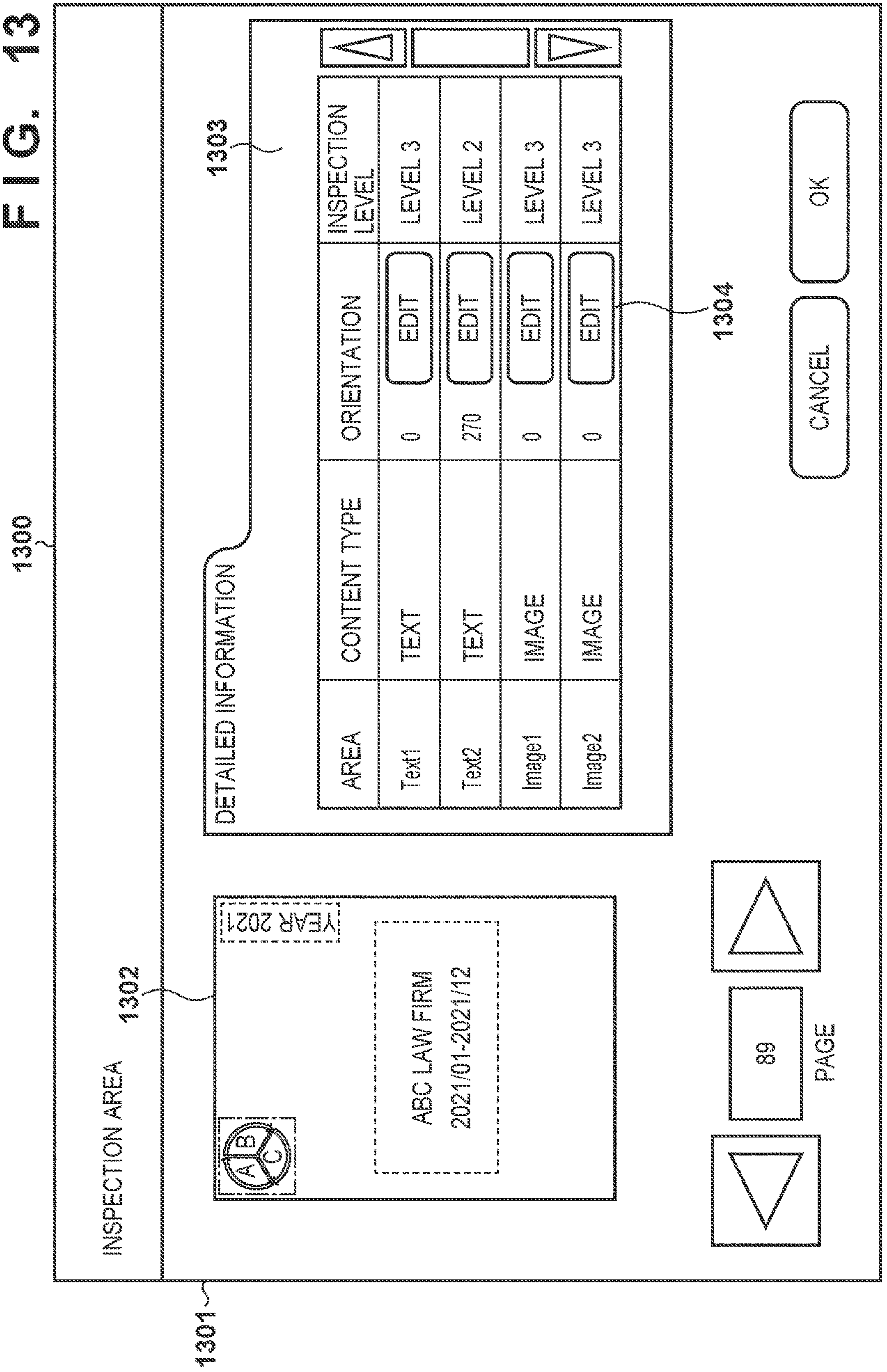
FIG. 13 is a diagram illustrating a setting confirmation screen to be displayed in the inspection apparatus according to the embodiment.

Next, an inspection area setting confirmation screen 1300 to be displayed on the inspection apparatus 108 according to the present embodiment will be described with reference to FIG. 13. The setting confirmation screen 1300 is displayed on the display unit 245 of the inspection apparatus 108 when the CPU 226 of the inspection apparatus 108 executes the above-described processing of step S1007 and includes an inspection area interface 1301.

The inspection area interface 1301 is configured to include a reference image display portion 1302, detailed content information setting value information 1303, and various buttons. The CPU 226 of the inspection apparatus 108 displays, on the reference image display portion 1302, a reference image against which inspection is to be performed by the inspection apparatus 108. As illustrated in FIG. 13, in the reference image, an area in which content, such as text and an image, are included is indicated by a frame, such as a dotted line or a dash-dotted line, according to the content area information 505. The type of line of the frame is changed according to the content type, such as text or image.

In the detailed content information setting value information 1303, the CPU 226 of the inspection apparatus 108 displays a list of setting values of content information to be inspected by the inspection apparatus 108. The content information includes, for each area, a content type, an orientation (direction information), an inspection level, and the like. Each area is assigned a unique identifier, such as "Text1" or "Image2". The content type indicates an attribute of an area, such as text, image, graph, table, or photo. The orientation indicates an orientation of content. In the present embodiment, when a content type is "text", any one of numeric values, 0, 90, 180, and 270, which indicate angles, is set. For other content types, 0 is set; however, the present invention is not limited to this. The inspection level indicates an index as to what degree of difference, as a result of comparison of a reference image and an inspection image, which is an image read from a printed product, causes a determination result to be no good. When there is a change to be made in the detailed content information setting value information 1303, a setting value can be changed by the user pressing a setting change button 1304, and the setting value can be reflected in the above-described processing from step S1008 to step S1009. Here, the setting change buttons 1304 for the orientation of the content are displayed as examples; however, the present invention is not limited to this, and other information may be changeable.

The inspection area interface 1301 on the display unit 245 displays the reference image display portion 1302, the detailed content information setting value information 1303, and the setting change buttons 1304; however, the inspection level and the content type may be changed, and a form thereof is not limited. In addition, the example illustrated here is an example of processing for one print sheet. For example, a configuration may be taken such that, in a case of a plurality of print sheets, in the processing of step S1206, if there is another sheet for which inspection result determination is unprocessed, the processing is returned to step S1201 and the inspection result determination processing is performed on all sheets, and a form thereof is not limited. In addition, a configuration may be taken so as to perform management in association with the page information.

<Result Display Screen>

Figure 14:
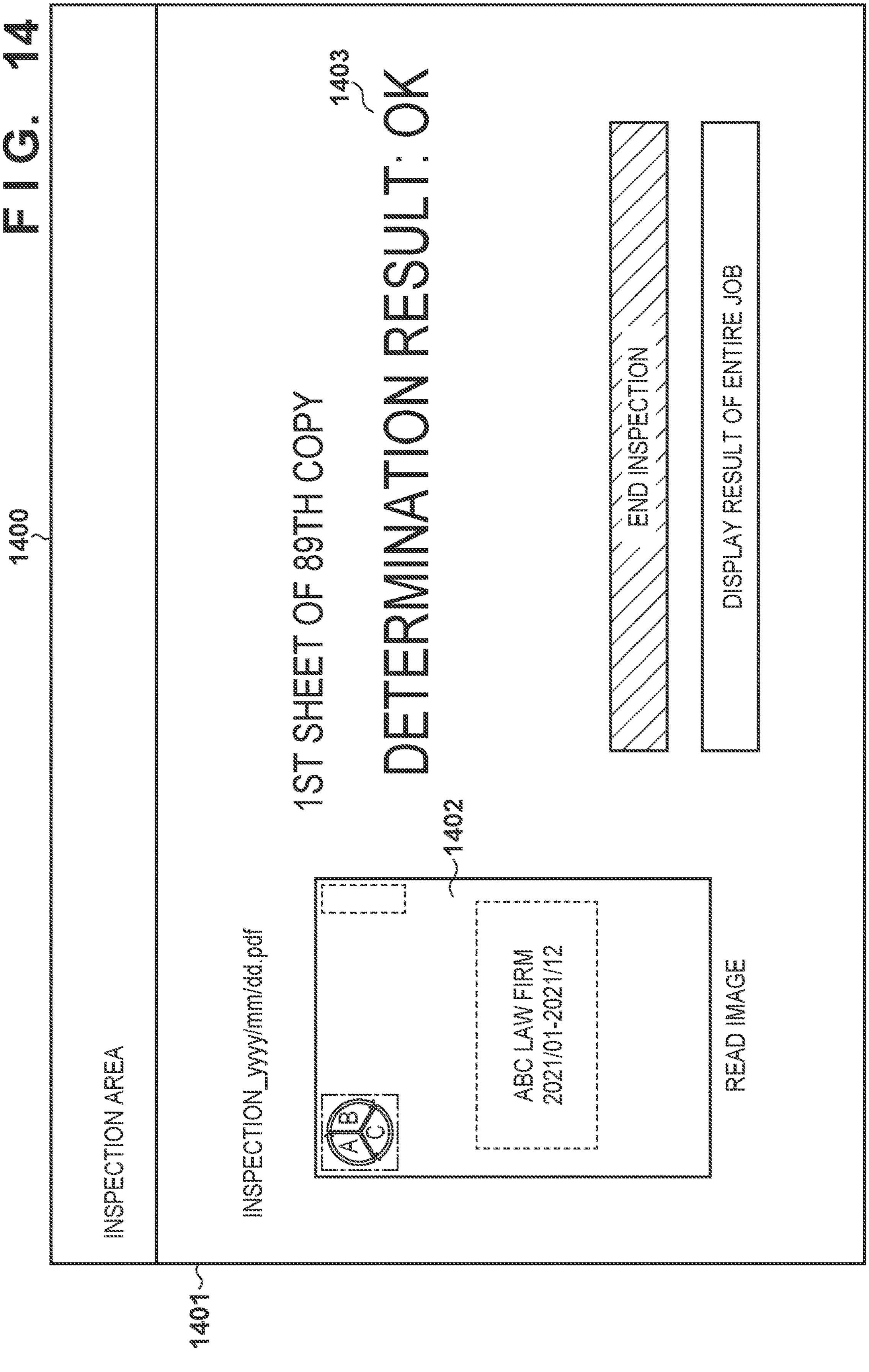
FIG. 14 is a diagram illustrating an inspection status screen to be displayed in the inspection apparatus according to the embodiment.

Next, an inspection result display screen 1400 to be displayed on the inspection apparatus 108 according to the present embodiment will be described with reference to FIG. 14. The inspection result display screen 1400 is displayed on the display unit 245 of the inspection apparatus 108 when the CPU 226 of the inspection apparatus 108 executes the above-described processing of step S1107 and includes an inspection status interface 1401.

The inspection status interface 1401 includes a read image (inspection image) display portion 1402 and an inspection result 1403. The CPU 226 of the inspection apparatus 108 displays, on the read image display portion 1402, a read image to be inspected by the inspection apparatus 108. As illustrated in FIG. 14, in the read image, an area in which content, such as text and an image, are included is indicated by a frame, such as a dotted line or a dash-dotted line, according to the content area information 505, similarly to in the reference image of the above-described display portion 1302. In the inspection result 1403, the CPU 226 of the inspection apparatus 108 displays the above-described inspection result of step S1107. Here, as an inspection result, an inspection result of one page of a printed product out of a plurality of pages included in one print job is displayed. Here, when a button "display result of entire job" is selected, results of all pages are displayed in a list. A list of results of all pages is not illustrated; however, for example, read images are not displayed and only the determination result of each page is displayed. Alternatively, a configuration may be taken so as to display only the page numbers for pages for which a determination result is OK and for pages for which a determination result is no good, respectively. In addition, although the inspection status interface 1401 on the display unit 245 displays the read image display portion 1402 and the inspection result 1403, information on the inspection apparatus 108 and the inspected job at the time of completion of the inspection may be displayed, and a form thereof is not limited. A configuration may be taken such that these inspection results are not only displayed on the display unit 245 but also transmitted as electronic data to another apparatus by e-mail, facsimile, or the like, or printed by the printing apparatus 101.

As described above, the inspection system according to the present embodiment is configured to include a printing apparatus, an information processing apparatus, and an inspection apparatus. The information processing apparatus receives a print job from an external apparatus and generates, from print data included in the print job, image data for printing and image area attribute information related to content for each area included in an image to be printed. In addition, for an area in which the image area attribute information indicates a text string attribute, the information processing apparatus extracts, from the print data, direction information related to an orientation of a text string and transmits, to the printing apparatus, the image area attribute information and the direction information, together with the image data for printing. The inspection apparatus receives the transmitted image data for printing, image area attribute information, and direction information via the printing apparatus. In addition, the inspection apparatus inspects a printed product, printed by the printing apparatus according to the image data for printing, by comparing a read image, obtained by reading the printed product, and a reference image, which is the received image data for printing, according to the image area attribute information and the direction information. As described above, by using text string direction information included in a print job, it is possible to automatically add the text string direction information to a text attribute area of content information used in the inspection apparatus.

In addition, the present inspection apparatus further displays the received image data for printing on a display unit of the inspection apparatus and displays information related to inspection that accords with the image area attribute information and the direction information in a changeable manner for each area included in an image to be printed. With this, by the user confirming the text string direction information automatically registered before the inspection, the user can confirm whether unintended image rotation processing has been performed during print processing and, if unintended image rotation processing has been performed, can make a change.

Second Embodiment

Hereinafter, a second embodiment of the present invention will be described. In the above-described first embodiment, a form in which the text string direction information 602 is extracted by analyzing PDL commands included in the print data 501 inputted to the inspection system and then the extracted text string direction information 602 is used for inspection by the inspection apparatus 108 has been described. However, in some cases, the print data 501 inputted to the inspection system does not include the text string direction information 602. Processing for such a case will be described in the present embodiment.

<Setting Confirmation Screen>

Figure 15:
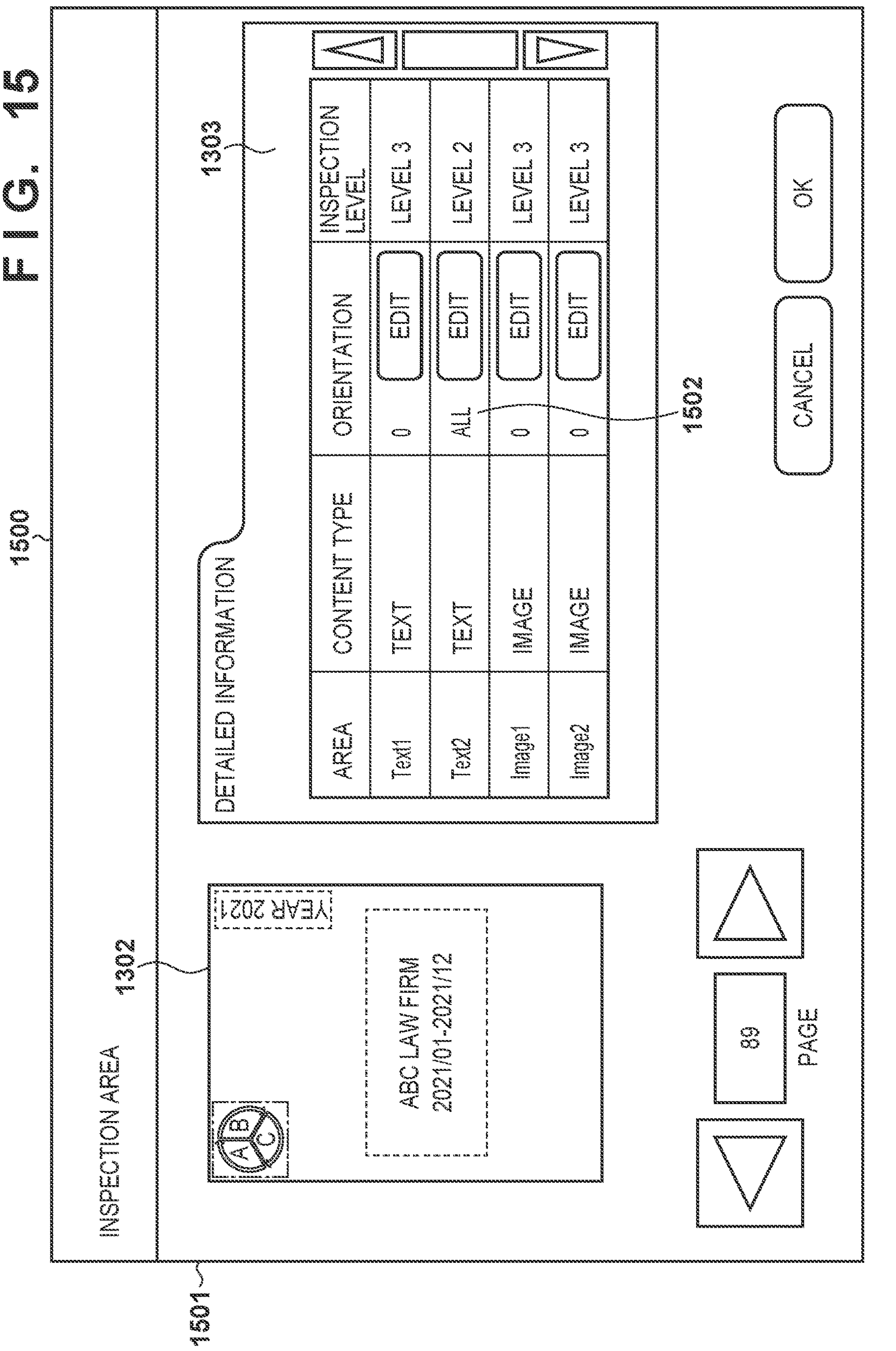
FIG. 15 is a diagram illustrating a setting screen to be displayed when there is no text string direction information according to one embodiment.

First, a setting confirmation screen 1500 to be displayed when there is no text string direction information 602 in the present embodiment will be described with reference to FIG. 15. The setting confirmation screen 1500 is displayed on the display unit 245 of the inspection apparatus 108 when the CPU 226 of the inspection apparatus 108 executes the above-described processing of step S1007 and includes an inspection area interface 1501. Configurations similar to those of the setting confirmation screen 1300 of FIG. 13 are assigned the same reference numerals, and description thereof will be omitted.

The inspection area interface 1501 is constituted by the reference image display portion 1302 and the detailed content information setting value information 1303. In the detailed setting value information 1303, unlike in FIG. 13, as indicated by reference numeral 1502, "ALL" is displayed as text direction information, instead of numeric values. This indicates a case where the print data 501 inputted to the inspection system does not include the text string direction information 602. That is, ALL 1502 means that there is no text string direction information 602 to be used when the inspection apparatus 108 inspects the text attribute area included in the print data 501. According to the present embodiment, in such a case, as will be described later with reference to FIG. 16, the CPU 226 of the inspection apparatus 108 extracts a text string by performing OCR processing in a plurality of directions (e.g., four directions, 0 degree, 90 degrees, 180 degrees, and 270 degrees). The text attribute direction information 605 displayed in the inspection area interface 1501 may display not only a numerical value indicating a direction but also a value indicating that there is no information, and a form thereof is not limited.

<Inspection Processing>

Figure 16:
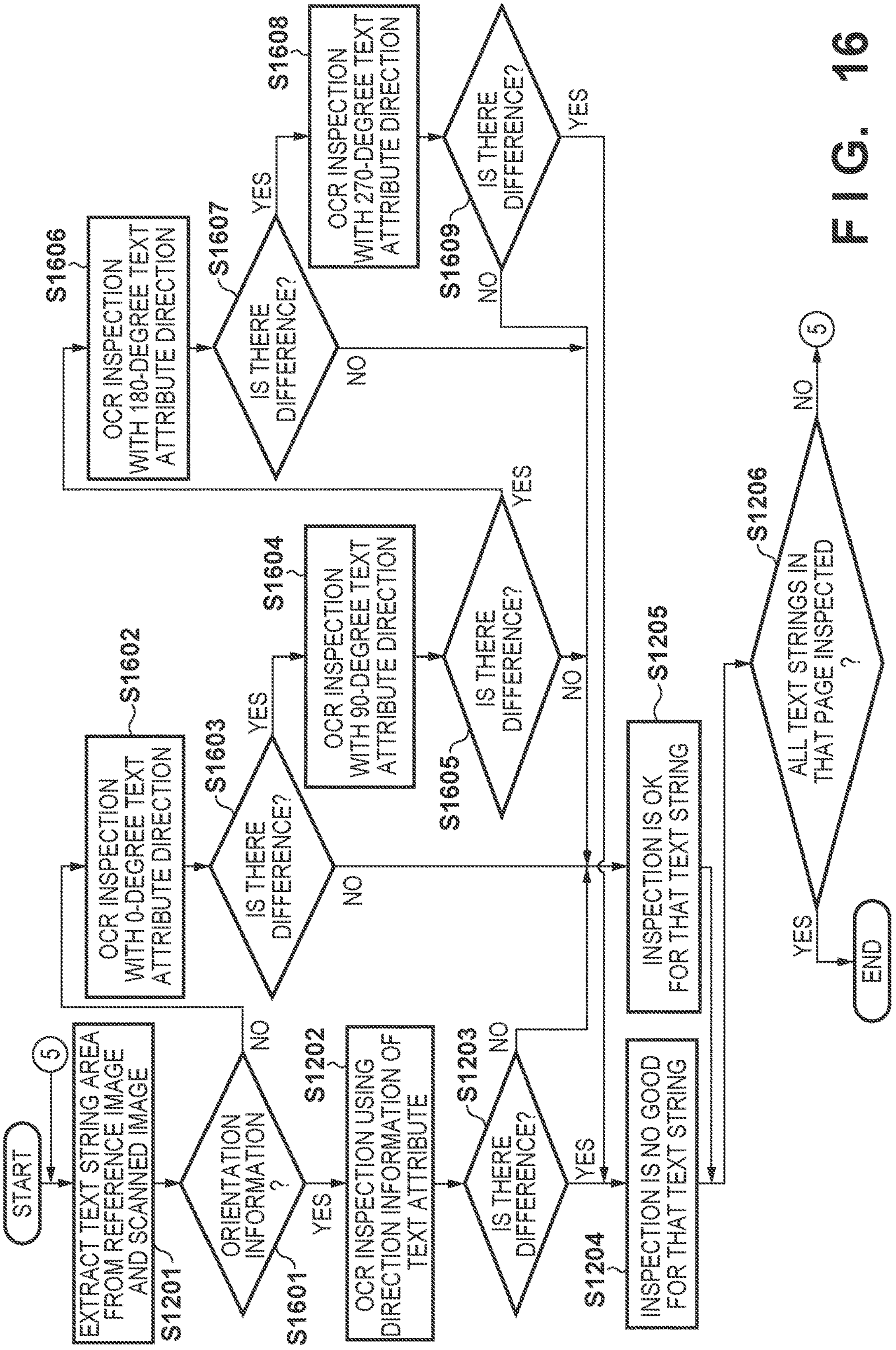
FIG. 16 is a flowchart for explaining text attribute area inspection processing for when there is no text string direction information according to one embodiment.

Next, a processing procedure for text attribute area inspection processing for a case where the text string direction information 602 is not included according to the present embodiment will be described with reference to FIG. 16. This processing is performed when the text string direction information 602 is not present in the above-described processing of step S1202. The processing to be described below is realized by, for example, the CPU 226 of the inspection apparatus 108 reading a program stored in the storage unit 228 into the RAM 227 and then executing the program. Processing similar to that in the flowchart of FIG. 12 is assigned the same step number, and description thereof will be omitted.

After extracting a text string area from an RIP image in step S1201, in step S1601, the CPU 226 of the inspection apparatus 108 determines whether the direction information 605 included in content information of the extracted text attribute area is present. If the text string direction information is present, the processing proceeds to step S1202, and if the direction information 605 is not present, the processing proceeds to step S1602.

In step S1602, since the text attribute direction information 605 is not included in content information of the extracted text attribute area, the CPU 226 extract a text string by performing OCR processing using a plurality of typical numeric values. Specifically, the CPU 226 extracts a text string by first performing OCR processing with the text attribute direction information 605 set to 0 degrees. Next, in step S1603, the CPU 226 compares text strings extracted from the scanned image and the reference image. If there is a difference, the processing proceeds to step S1604, and if there is no difference, the processing proceeds to step S1205.

In step S1604, the CPU 226 extracts a text string by performing OCR processing with the text attribute direction information 605 set to 90 degrees. Next, in step S1605, the CPU 226 compares text strings extracted from the scanned image and the reference image. If there is a difference, the processing proceeds to step S1606, and if there is no difference, the processing proceeds to step S1205. Similarly, in step S1606, the CPU 226 extracts a text string by performing OCR processing with the text attribute direction information 605 set to 180 degrees. Next, in step S1607, the CPU 226 compares text strings extracted from the scanned image and the reference image. If there is a difference, the processing proceeds to step S1608, and if there is no difference, the processing proceeds to step S1205. Similarly, in step S1608, the CPU 226 extracts a text string by performing OCR processing with the text attribute direction information 605 set to 270 degrees. Next, in step S1609, the CPU 226 compares text strings extracted from the scanned image and the reference image. If there is a difference, the processing proceeds to step S1204, and if there is no difference, the processing proceeds to step S1205.

Figure 12:
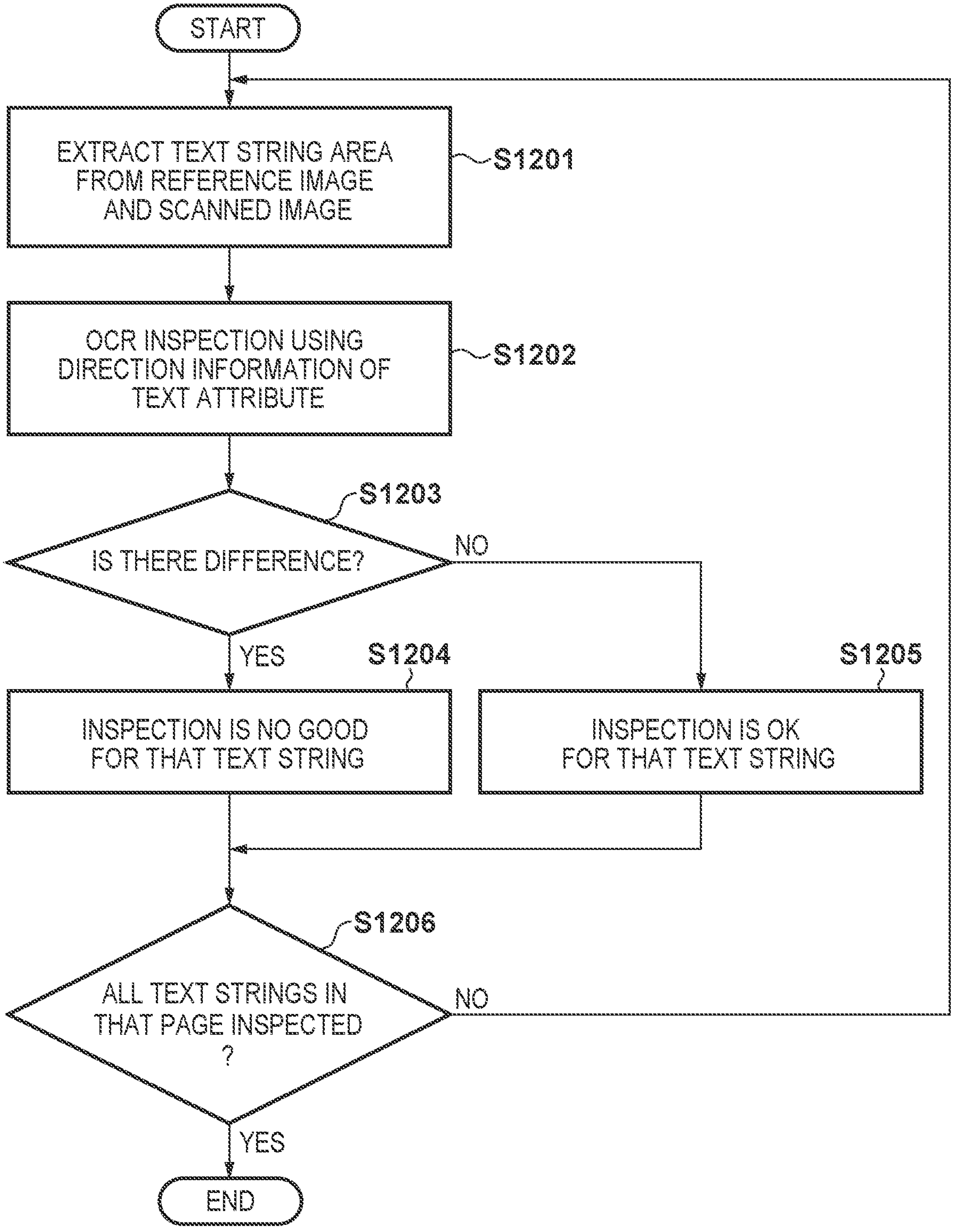
FIG. 12 is a flowchart for explaining inspection determination processing of the inspection apparatus according to one embodiment.

Processing from step S1204 to step S1206 is similar to that in the flowchart of FIG. 12, and thus, detailed description thereof is omitted. Here, when the text attribute direction information 605 is not included, OCR processing in which 0 degree, 90 degrees, 180 degrees, and 270 degrees are used as typical numeric values is performed; however, a numeric value may be another numeric value, and a form thereof is not limited. In addition, the example illustrated here is an example of processing for one print sheet. For example, a configuration may be taken such that, in a case of a plurality of print sheets, in the processing of step S1206, if there is another sheet for which inspection result determination is unprocessed, the processing is returned to step S1201 and the inspection result determination processing is performed on all sheets, and a form thereof is not limited. In addition, a configuration may be taken so as to perform management in association with the page information. As described above, when text string direction information is not included in a print job, it is possible to inspect a text attribute area by using predetermined text string direction information.

When direction information is set to "ALL" on the setting confirmation screen 1500, the user can set the direction to a predetermined orientation (angle) by using an edit button. In such a case, the same inspection processing as in the first embodiment is performed for the set orientation.

Third Embodiment

Hereinafter, a third embodiment of the present invention will be described. In the above-described second embodiment, processing for performing OCR processing in a plurality of directions in order to obtain a text string when the text string direction information 602 is not included in the print data 501 inputted to the inspection system has been described. In the present embodiment, a case where OCR processing in a plurality of directions is not performed when the text string direction information 602 is not included will be described.

Figure 17:
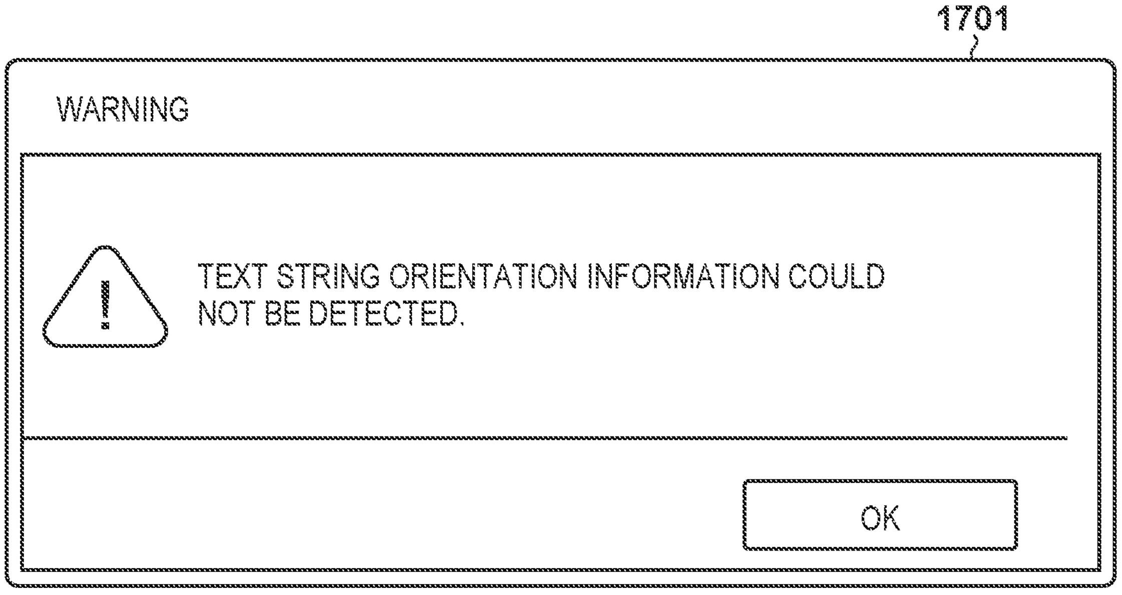
FIG. 17 is a diagram illustrating a warning screen to be displayed when there is no text string direction information according to one embodiment.

A warning screen 1701 to be displayed when the text string direction information 602 is not included according to the present embodiment will be described with reference to FIG. 17. When it is determined in the above-described step S1601 that the text string direction information 602 is not included, the CPU 226 of the inspection apparatus 108 may display the warning screen 1701 illustrated in FIG. 17 on the display unit 245. As described above, when the text string direction information 602 is not included in a print job, by displaying a message including something to that effect as a warning to the user, it is possible to prevent omission of text string direction information setting and execute text attribute area inspection. Upon confirming the warning, the user can set the direction information 605 via the setting change button 1304 on the setting confirmation screen 1300.

<Variation>

Various modifications can be made to the above-described embodiments. For example, in the above-described embodiments, an example in which the printing apparatus 101 and the information processing apparatus 109 are individually provided as different apparatuses has been described. However, the printing apparatus and the information processing apparatus may be integrally provided as a single apparatus. Further, an example in which, in the above-described inspection system, the inspection unit 106 that includes a reading unit, such as a scanner, and the inspection apparatus 108 are individually provided as different apparatuses has been described; however, the inspection unit may be provided in the inspection apparatus. Alternatively, the printing apparatus and the inspection unit may be integrally provided. In addition, in the above-described embodiments, an example in which a CIS is provided above and below a sheet conveyance path so as to be able to simultaneously read both sides (front side and back side) of a conveyed sheet has been described; however, the present invention is not intended to be limited, and a single CIS may be used to read both sides. In such a case, a configuration may be taken such that after one side is read, the other side is read using a conveyance path for redirecting the sheet to be inspected.

In addition, in the above-described embodiments, an example in which direction information is extracted from print data and used for inspection for a text attribute area has been described; however, the present invention is not intended to be limited, and similar processing may be performed for another attribute area that has direction information.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-139348, filed Sep. 1, 2022, which is hereby incorporated by reference herein in its entirety.

What is claimed is:

1. An inspection system comprising a printing apparatus, an information processing apparatus, and an inspection apparatus, the information processing apparatus comprising: at least one first memory device that stores a set of first instructions; and at least one first processor that executes the set of first instructions to:

accept a print job from an external apparatus;

generate, from print data included in the print job, image data for printing and image area attribute information related to content for each area included in an image to be printed;

for an area in which the image area attribute information indicates a text string attribute, extract, from the print data, direction information related to an orientation of a text string; and transmit, to the printing apparatus, the image area attribute information and the direction information, together with the image data for printing, and the inspection apparatus comprising: at least one second memory device that stores a set of second instructions; and at least one second processor that executes the set of second instructions to:

receive, via the printing apparatus, the transmitted image data for printing, the image area attribute information, and the direction information; and inspect a printed product, printed by the printing apparatus according to the image data for printing, by comparing a read image, obtained by reading the printed product, and a reference image, which is the received image data for printing, according to the image area attribute information and the direction information.

2. The inspection system according to claim 1, wherein the at least one second processor executes second instructions in the second memory device to:

display the received image data for printing on a display unit of the inspection apparatus and display information related to inspection that accords with the image area attribute information and the direction information in a changeable manner for each area included in an image to be printed.

3. The inspection system according to claim 2, wherein the at least one second processor executes second instructions in the second memory device to:

change at least the direction information for each area.

4. The inspection system according to claim 2, wherein the at least one second processor executes second instructions in the second memory device to:

in a case of an area in which the image area attribute information indicates a text string attribute and where corresponding direction information is not present, display information indicating something to that effect on the display unit.

5. The inspection system according to claim 2, wherein the at least one second processor executes second instructions in the second memory device to:

perform inspection by comparing a text string, obtained by performing, for an area in which the image area attribute information indicates a text string attribute, OCR processing in a text string orientation that accords with the direction information, and a text string of the reference image, and in a case where an area in which the image area attribute information indicates a text string attribute and corresponding direction information is not present, perform OCR processing in a plurality of directions for the area.

6. The inspection system according to claim 5, wherein the plurality of directions include at least four orientations, which are 0 degrees at which a text string is not rotated from a normal orientation and orientations in which a text string has been rotated by 90 degrees, 180 degrees, and 270 degrees, respectively, from the normal orientation.

7. The inspection system according to claim 2, wherein the at least one second processor executes second instructions in the second memory device to:

in a case of an area in which the image area attribute information indicates a text string attribute and where corresponding direction information is not present, display a warning screen including a message to that effect on the display unit and prompt a user to set the direction information.

8. The inspection system according to claim 1, wherein the print data is a PDL command, and wherein the at least one first processor executes first instructions in the first memory device to: extract the direction information by analyzing the PDL command.

9. An inspection apparatus capable of communicating with a printing apparatus, the inspection apparatus comprising:

at least one memory device that stores a set of instructions; and at least one processor that executes the set of instructions to:

receive, via the printing apparatus, image data for printing, image area attribute information related to content for each area included in an image to be printed, and, for an area in which the image area attribute information indicates a text string attribute, direction information related to an orientation of a text string, which have been transmitted from the information processing apparatus to the printing apparatus; and inspect a printed product, printed by the printing apparatus according to the image data for printing, by comparing a read image, obtained by reading the printed product, and a reference image, which is the received image data for printing, according to the image area attribute information and the direction information, wherein the image data for printing, the image area attribute information, and the direction information are information obtained by the information processing apparatus from print data included in a print job.

10. A method of controlling an inspection system comprising a printing apparatus, an information processing apparatus, and an inspection apparatus, the method comprising:

in the information processing apparatus, accepting a print job from an external apparatus;

generating, from print data included in the print job, image data for printing and image area attribute information related to content for each area included in an image to be printed;

for an area in which the image area attribute information indicates a text string attribute, extracting, from the print data, direction information related to an orientation of a text string; and transmitting, to the printing apparatus, the image area attribute information and the direction information, together with the image data for printing, and in the inspection apparatus, receiving, via the printing apparatus, the transmitted image data for printing, the image area attribute information, and the direction information; and inspecting a printed product, printed by the printing apparatus according to the image data for printing, by comparing a read image, obtained by reading the printed product, and a reference image, which is the received image data for printing, according to the image area attribute information and the direction information.

11. A method of controlling an inspection apparatus capable of communicating with a printing apparatus, the method comprising:

receiving, via the printing apparatus, image data for printing, image area attribute information related to content for each area included in an image to be printed, and, for an area in which the image area attribute information indicates a text string attribute, direction information related to an orientation of a text string, which have been transmitted from the information processing apparatus to the printing apparatus; and inspecting a printed product, printed by the printing apparatus according to the image data for printing, by comparing a read image, obtained by reading the printed product, and a reference image, which is the received image data for printing, according to the image area attribute information and the direction information, wherein the image data for printing, the image area attribute information, and the direction information are information obtained by the information processing apparatus from print data included in a print job.

* * * * *